US012090415B1

(12) United States Patent
Yan

(10) Patent No.: US 12,090,415 B1
(45) Date of Patent: Sep. 17, 2024

(54) CRANE MACHINE

(71) Applicant: Canqi Yan, Shantou (CN)

(72) Inventor: Canqi Yan, Shantou (CN)

( * ) Notice: Subject to any disclaimer, the term of this patent is extended or adjusted under 35 U.S.C. 154(b) by 0 days.

(21) Appl. No.: 18/533,842

(22) Filed: Dec. 8, 2023

(51) Int. Cl.
*A63F 9/30* (2006.01)
*G07F 17/32* (2006.01)

(52) U.S. Cl.
CPC ............ *A63F 9/30* (2013.01); *G07F 17/3297* (2013.01)

(58) Field of Classification Search
CPC ......... A63F 9/30; A63F 9/305; G07F 17/3297
See application file for complete search history.

(56) References Cited

U.S. PATENT DOCUMENTS 20,287 A * 5/1858 McLaughlin ............ D07B 7/14 57/10
2,600,849 A * 6/1952 Collins ............... G07F 17/3295 294/201
3,491,479 A * 1/1970 Carter ................ A63H 33/3072 446/145
3,572,703 A * 3/1971 Greene ................. A63F 7/0058 221/210
7,841,599 B2 * 11/2010 Todokoro ................ G07F 17/32 273/447
2017/0080329 A1 * 3/2017 Todokoro .................. A63F 9/30

OTHER PUBLICATIONS

Arcade Warrior, "How To Fix A Mini Claw Machine 100% Working!," Dec. 23, 2013, https://www.youtube.com/watch?v=SI30degCmus (Year: 2013).*

* cited by examiner

*Primary Examiner* — Melba Bumgarner
*Assistant Examiner* — Amir A Klayman

(57) ABSTRACT

The present disclosure provides a crane machine, including a first driving unit, a gripping device, a movable rope, and a fixed rope. The first driving unit includes a first motor, a first transmission shaft, a fixed wheel, and a movable wheel; the fixed wheel is fixedly connected to the first transmission shaft, and the movable wheel is movably connected to the first transmission shaft. The fixed wheel is arranged with a first limiting portion, and the movable wheel is arranged with a second limiting portion; in a first state, the first limiting portion is spaced apart from the second limiting portion, and the fixed wheel rotates relative to the movable wheel; in a second state, the first limiting portion abuts against the second limiting portion, causing the fixed wheel to drive the movable wheel to rotate synchronously.

10 Claims, 16 Drawing Sheets

CRANE MACHINE

TECHNICAL FIELD

The present disclosure relates to technical field of toy equipment, especially relates to a crane machine.

BACKGROUND

A conventional crane machine has a gripper that is controlled by an electromagnet. Specifically, an electromagnetic magnetic switch is set, the gripper is opened when the magnetic switch is not energized, and the gripper is closed when the magnetic switch is energized. As the magnetic switch is required to be operated and controlled separately to realize the opening or closing of the gripper, it is also necessary to control the movement of the gripper in the spatial orientation separately, which makes the control of the gripper more cumbersome, with poor user experience, such that it is difficult to operate for some user groups, such as small children.

SUMMARY OF THE DISCLOSURE

The main purpose of the present disclosure is to propose a crane machine, aiming to improve the ease of operation of the gripper and enhance the user experience.

In order to realize the above purpose, the present disclosure proposes a crane machine, including: a first driving unit, a gripping device, a movable rope, and a fixed rope; wherein the first driving unit includes a first motor, a first transmission shaft, a fixed wheel, and a movable wheel; the first motor is configured to drive the first transmission shaft to rotate; the fixed wheel is fixedly connected to the first transmission shaft, and the movable wheel is movably connected to the first transmission shaft; the fixed wheel is arranged with a first limiting portion, and the movable wheel is arranged with a second limiting portion; in a first state, the first limiting portion is spaced apart from the second limiting portion, and the fixed wheel rotates relative to the movable wheel; in a second state, the first limiting portion abuts against the second limiting portion, causing the fixed wheel to drive the movable wheel to rotate synchronously; two ends of the movable rope are connected to the gripping device and the fixed wheel, respectively; the fixed wheel is configured to make the movable rope coiled on the fixed wheel by rotating; in condition of the movable rope being in a slack state, the gripping device is in an open state; in condition of the movable rope being in a taut state, the gripping device is in a closed state; two ends of the fixed rope are connected to the gripping device and the movable wheel, respectively; the movable wheel is configured to make the fixed rope coiled on the movable wheel by rotating, for controlling lifting and lowering of the gripping device.

In some embodiments, the crane machine further includes a main body, a first housing, and a second driving unit; the main body defines a storage cavity and an outlet channel that are in communication; the first housing is arranged at a top of the storage cavity; the first driving unit is arranged on the first housing, and the second driving unit is fixed to the first housing; the second driving unit includes a second motor and a first mating gear; the main body includes a first rack extending along a first horizontal direction, the first mating gear engages with the first rack, and the second motor is capable of driving the first mating gear to rotate to cause the second driving unit to move in the first horizontal direction.

In some embodiments, the crane machine further includes a third driving unit fixed relative to the first driving unit; the third driving unit includes a third motor and a second mating gear, and the first housing includes a second rack, the second rack extending in a second horizontal direction; the second mating gear engages with the second rack, and the third motor is capable of driving the second mating gear to rotate to cause the third driving unit and the first driving unit to move in the second horizontal direction; the first horizontal direction intersects with the second horizontal direction.

In some embodiments, the crane machine further includes a second housing; the first housing defines a mounting cavity, and the second housing and the second driving unit are disposed in the mounting cavity; the second housing defines a mounting groove, and the first driving unit and the third driving unit are fixed in the mounting groove.

In some embodiments, a bottom surface of the second housing is arranged with a pillar, and the first housing defines a sliding groove extending in the second horizontal direction; the pillar is movable along a length direction of the sliding groove.

In some embodiments, the crane machine further includes a first resilient member; in the first state, the first resilient member abuts against the movable wheel to restrict a synchronized rotation of the movable wheel with the first transmission shaft.

In some embodiments, the crane machine further includes a second housing; wherein the first driving unit is disposed within the second housing; the first resilient member includes a resilient arm and a spring; the resilient arm includes a first resilient segment and a second resilient segment, wherein the first resilient segment abuts against a peripheral surface of the movable wheel, and the second resilient segment abuts against the second housing; an end of the spring abuts against the first resilient segment, and the other end of the spring abuts against the second resilient segment or the second housing; the first resilient segment is capable of approach the second resilient segment in response to the first resilient segment being squeezed.

In some embodiments, the first driving unit further includes a first gear, a second gear, a third gear, a fourth gear, and a second transmission shaft; the first gear is movably connected to the first transmission shaft, and the second gear is fixedly connected to the first transmission shaft; the third gear is movably connected to the second transmission shaft to be rotatable around the second transmission shaft and movable axially along the second transmission shaft; the fourth gear is fixedly connected to the second transmission shaft; the first gear engages with an output shaft of the first motor and the third gear, respectively, and the second gear engages with the fourth gear; in a first motion state, the third gear and the fourth gear rotate synchronously by abutting against each other; in a first locked state, the third gear rotates and the fourth gear stops rotating.

In some embodiments, an end of the third gear back away from the fourth gear is further arranged with a second resilient member; in the first motion state, the second resilient member is in a compressed state to push the third gear against the fourth gear; in the first locked state, the third gear squeezes the second resilient member in a direction away from the fourth gear, causing the third gear to rotate relative to the fourth gear.

In some embodiments, the fixed wheel includes a first wheel body and a second wheel body disposed along a rotation axis of the fixed wheel; the first wheel body defines a first groove, and the second wheel body defines a second groove, with the first groove and the second groove being disposed opposite each other; the movable rope includes a first rope body and a plurality of first spheres sequentially disposed on the first rope body, wherein a part of one of the plurality of first spheres is disposed in the first groove, and another part of the one of the plurality of first spheres is disposed in the second groove; the first spheres is capable of movably cooperating with the first groove and the second groove; and/or the movable wheel includes a third wheel body and a fourth wheel body disposed along a rotation axis of the movable wheel; the third wheel body defines a third groove and the fourth wheel body defines a fourth groove, with the third groove and the fourth groove being disposed opposite each other; the fixed rope includes a second rope body and a plurality of second spheres sequentially disposed on the second rope body, wherein a part of one of the plurality of second spheres is disposed in the third groove, and another part of the one of the plurality of second spheres is disposed in the fourth groove; the second spheres is capable of movably cooperating with the third groove and the fourth groove.

In some embodiments, the first limiting portion is arranged on a side of the fixed wheel facing the movable wheel, the second limiting portion is arranged on a side of the movable wheel facing the fixed wheel, and the first limiting portion and the second limiting portion are each arranged as a protrusion.

In some embodiments, the main body includes a base, a top cover, and a plurality of support rods; the plurality of support rods are distributed around the base; a lower end of each support rod is connected to the base, and an upper end of each support rod is connected to the top cover; the base, the top cover, and the plurality of support rods jointly enclose each other to define the storage cavity; an alignment channel is defined within one of the plurality of support rods, and the alignment channel is configured for a power supply connecting wire to be threaded.

For the crane machine of the present disclosure, when the gripping device descends, the gripping device is opened to realize the grasping of the doll or other items; when the gripping device is required to rise, the gripping device is closed to grasp the doll. In this way, the opening and closing of the gripping device can be changed with the lifting movement, that is, the lifting movement of the gripping device and the opening and closing movement are controlled by the same motor. Therefore, there is no need to operate separately, and the two functions can be realized by only one operation. In this way, the operation of the gripping device is simple and convenient, and the user experience is better, which is suitable for operation by smaller children.

BRIEF DESCRIPTION OF THE DRAWINGS

In order to more clearly illustrate the technical solutions in the embodiments of the present disclosure, the accompanying drawings to be used in the description of the embodiments will be briefly introduced below, and it is obvious that the accompanying drawings in the following description are only some of the embodiments of the present disclosure, and other accompanying drawings can be obtained according to these drawings for those skilled in the art without giving creative labor.

REFERENCE NUMERALS

Figure 1:
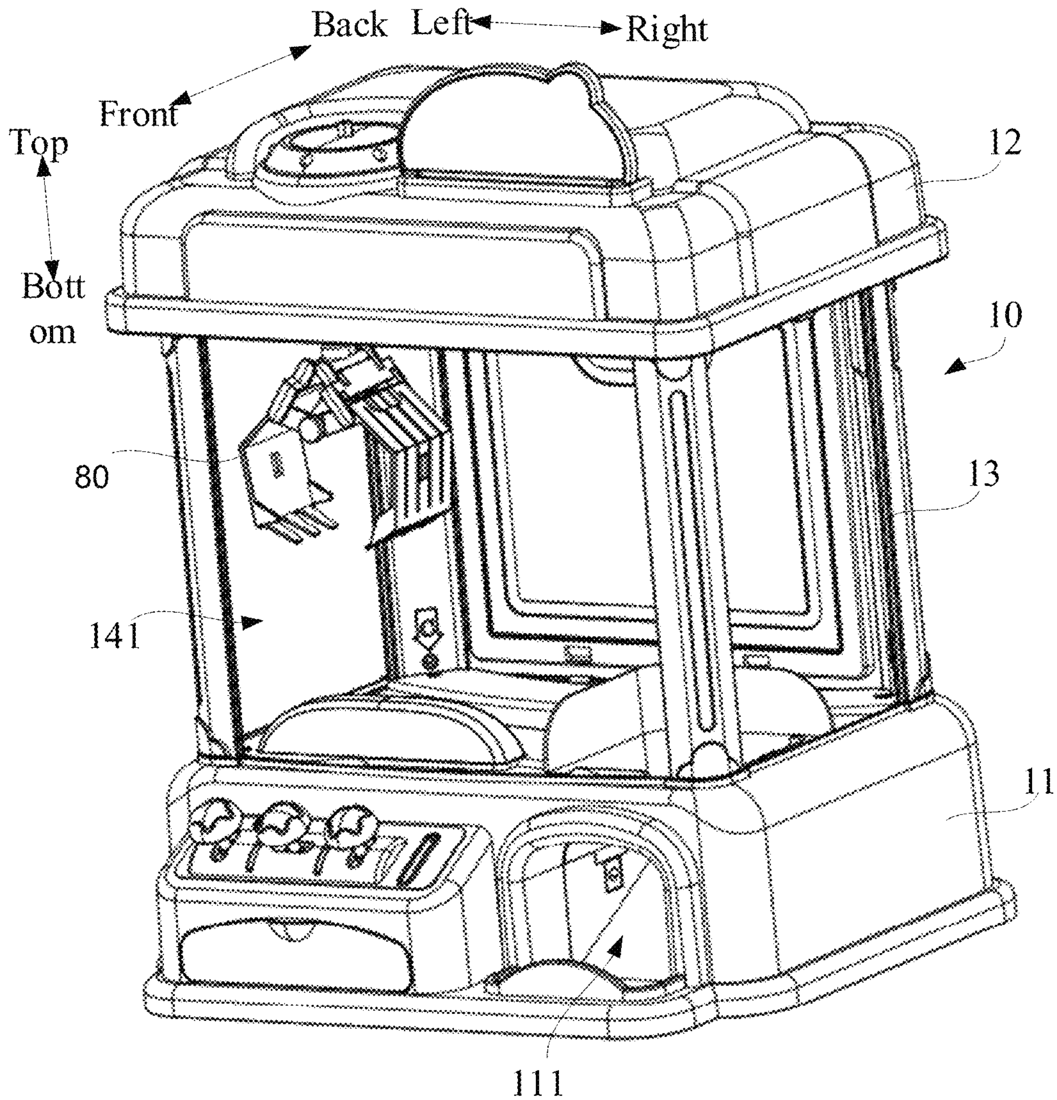
FIG. 1 is a structural schematic view of a crane machine, viewed from a front side, according to some embodiments of the present disclosure.

| No. | Name | No. | Name | No. | Name |
|---|---|---|---|---|---|
| 10 | main body | 223 | second limiting portion | 42 | eleventh gear |
| 11 | base | 23 | first gear | 43 | twelfth gear |
| 111 | outlet channel | 231 | large gear section | 44 | thirteenth gear |
| 12 | top cover | 232 | small gear section | 45 | fourteenth gear |
| 13 | support rod | 25 | second gear | 46 | fifteenth gear |
| 131 | first rod body | 26 | third gear | 47 | fifth transmission shaft |
| 132 | second rod body | 27 | fourth gear | 48 | sixth transmission shaft |
| 133 | alignment channel | 281 | first transmission shaft | 49 | third spacer |
| 14 | enclosure | 282 | second transmission shaft | 50 | first housing |
| 141 | storage cavity | 291 | first spacer | 51 | guide groove |
| 15 | first rack | 292 | First resilient member | 52 | second rack |
| 16 | guide rail | 2921 | first resilient segment | 53 | sliding groove |
| 20 | first driving unit | 2922 | second resilient segment | 54 | mounting cavity |
| 201 | first motor | 30 | second driving unit | 60 | second housing |
| 202 | first wheel train | 301 | second motor | 61 | holding groove |
| 21 | fixed wheel | 302 | second wheel train | 62 | pillar |
| 211 | first wheel body | 31 | first mating gear | 63 | mounting groove |
| 2111 | first groove | 32 | fifth gear | 71 | movable rope |
| 2112 | insertion post | 33 | seventh gear | 711 | first rope body |
| 212 | second wheel body | 34 | eighth gear | 712 | first sphere |
| 2121 | second groove | 35 | ninth gear | 72 | fixed rope |
| 2122 | insertion groove | 36 | tenth gear | 721 | second rope body |
| 213 | first limiting portion | 371 | third transmission shaft | 722 | second sphere |
| 22 | movable wheel | 372 | fourth transmission shaft | 80 | gripping device |
| 221 | third wheel body | 38 | second spacer | 81 | fixed rod |
| 2211 | third groove | | | 82 | movable rod |
| 222 | fourth wheel body | | | | |

-continued

| No. | Name | No. | Name | No. | Name |
|---|---|---|---|---|---|
| 2221 | fourth groove | 40 | third driving unit | 83 | connection arm |
| | | 401 | third motor | 84 | gripping arm |
| | | 402 | third wheel train | | |
| | | 41 | second mating gear | | |

DETAILED DESCRIPTION

The technical solutions in the embodiments of the present disclosure will be described clearly and completely in the following in conjunction with the accompanying drawings in the embodiments of the present disclosure, and it is obvious that the described embodiments are only a part of the embodiments of the present disclosure and not all of the embodiments. Based on the embodiments in the present disclosure, all other embodiments obtained by those skilled in the art without making creative labor fall within the scope of the present disclosure.

It is to be noted that in the description of the present disclosure, when the terms “second”, “third”, etc. appear, the terms “second”, “third”, etc. are intended only to facilitate the description of different parts or names, and are not to be understood as indicating or implying sequential relationships, relative importance, or implicitly specifying the number of technical features indicated. As a result, a feature defined with “second” or “third” may include at least one such feature, either explicitly or implicitly. In addition, when “and/or” appears throughout the text, it is meant to include three concurrent solutions, and in the case of “A and/or B”, it indicates a solution including A alone, B alone, and both A and B.

Figure 2:
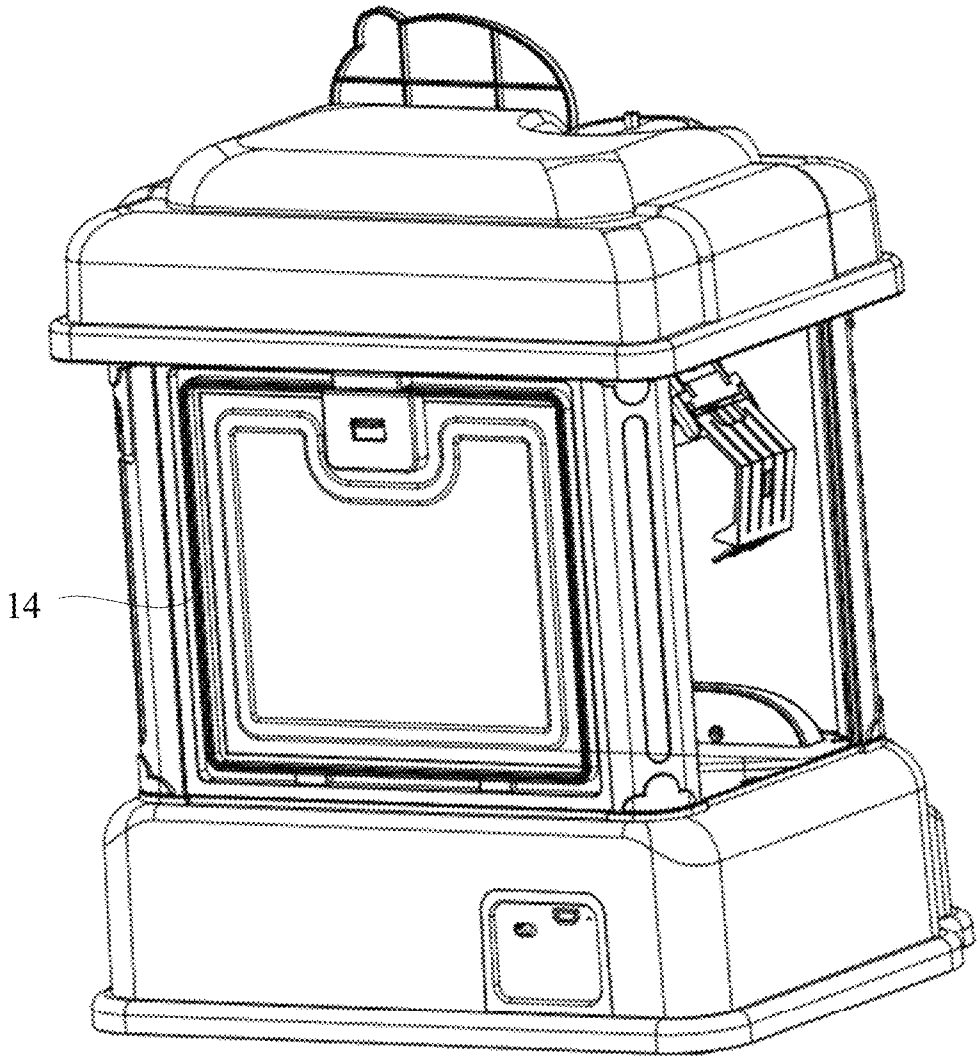
FIG. 2 is a structural schematic view of the crane machine in FIG. 1 viewed from a back side.

Referring to FIGS. 1 and 2, the embodiments of the present disclosure propose a crane machine, which may be applied as a small tabletop crane machine, suitable for use by children. Of course, the crane machine may further be applied in other scenarios.

The crane machine includes a main body 10, the main body 10 defines a storage cavity 141 and an outlet channel 111; the outlet channel 111 passes through both ends of the main body 10; an end of the outlet channel 111 is in communication with the storage cavity 141, and the other of the outlet channel 111 is connected to an outside world. The storage cavity 141 is configured to hold an item to be grabbed, such as a doll, and when the item is grabbed it can be dropped into the outlet channel 111.

In some embodiments, the main body 10 includes a base 11, a top cover 12, and multiple support rods 13; the multiple support rods 13 are distributed around the base 11; a lower end of each support rod 13 is connected to the base 11, and an upper end of each support rod 13 is connected to the top cover 12; the base 11, the top cover 12, and the multiple support rods 13 jointly enclose each other to define the storage cavity 141. The outlet channel 111 is disposed in the base 11, an end of the outlet channel 111 runs through an upper surface of the base 11, and the other end of the outlet channel 111 runs through a side surface of the base 11. A first driving unit 20, a second driving unit 30, and a third driving unit 40 (described in later embodiments) are arranged in the storage cavity 141 and are disposed at a top of the storage cavity 141.

In order to avoid the item from falling out, the main body 10 further includes an enclosure 14; the enclosure 14 is arranged around the base 11, a lower end of the enclosure 14 is connected to the base 11, and an upper end of the enclosure 14 is connected to the top cover 12, such that the enclosure 14, the top cover 12, and the base 11 together enclose to define the closed shape of the storage cavity 141. The support rods 13 may be provided on an inner side of the enclosure 14 and contact with the enclosure 14 to realize a supporting function. The enclosure 14 may be an integral circular plate; or, the enclosure 14 may include multiple cover plates disposed separately, and any two adjacent support rods 13 are respectively covered by a corresponding cover plate.

In order to facilitate timely replacement or addition of items to the storage cavity 141, in some embodiments, an opening is defined at a back side of the enclosure 14; the opening is covered by a movable plate, the movable plate is detachably connected to the enclosure 14, and items can be retrieved and placed from the opening by opening the movable plate. The movable plate and the enclosure 14 may be detachably connected by means of a snap clamping, a pin plug, or the like. Alternatively, in some embodiments, the top cover 12 defines an opening, a movable plate is detachably connected to the top cover 12, and items can be retrieved and placed from the opening by opening the movable plate.

Figure 3:
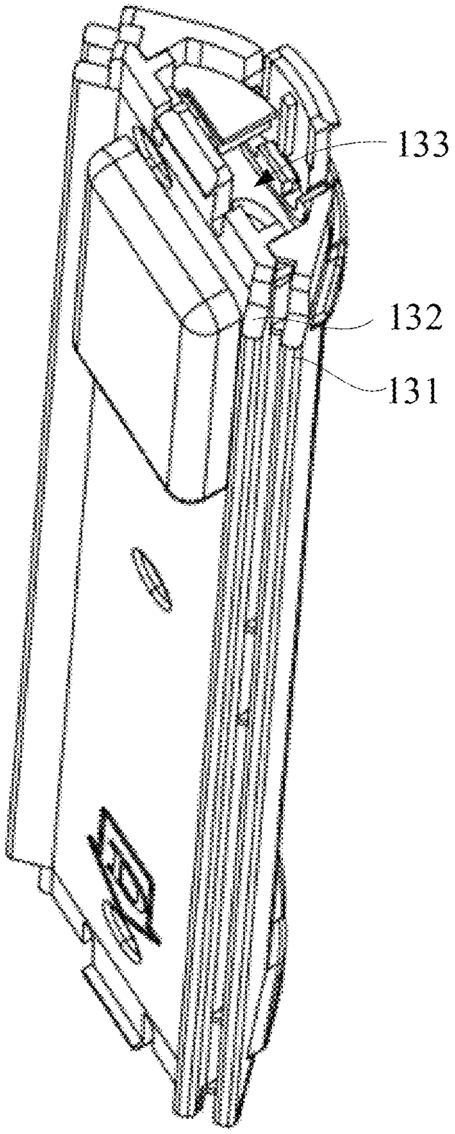
FIG. 3 is a structural schematic view of a support rod in FIG. 1.

Referring to FIG. 3, to facilitate alignment, an alignment channel 133 is defined within one of the support rods 13. Typically, all or a portion of the enclosure 14 is made of a transparent material to enable observing the storage cavity 141. Therefore, hiding the alignment channel 133 within the support rod 13 not only avoids the wiring from being exposed, but also allows the elongated support rod 13 to better guide the wiring.

Specifically, the support rod 13 defining the alignment channel 133 includes a first rod body 131 and a second rod body 132; the first rod body 131 is arc-shaped and forms an arc-shaped through slot, and a length direction of the arc-shaped through slot is the same as a length direction of the first rod body 131. The second pole body 132 covers an opening of the arc-shaped through slot to define the alignment channel 133. The first pole body 131 and the second pole body 132 may be detachably connected, such as by a snap-fit, so as to facilitate opening the alignment channel 133 for maintenance of the wiring.

In some embodiments, the main body 10 is substantially square in shape, and one support rod 13 is arranged corresponding to each corner of the main body 10, i.e., a total of four support rods 13 are provided, three of which may be of the same shape, and the other one of which may be of a different shape and define the alignment channel 133.

Referring to FIGS. 4 to 7, the crane machine includes: a first driving unit 20, a gripping device 80, a movable rope 71 and a fixed rope 72, etc.

The first driving unit 20 includes a first motor 201 and a first wheel train 202; the first wheel train 202 includes a first transmission shaft 281, a fixed wheel 21, and a movable wheel 22; the fixed wheel 21 is fixedly connected to the first transmission shaft 281, and the movable wheel 22 is movably connected to the first transmission shaft 281 to be rotatable relative to the first transmission shaft 281.

The fixed wheel 21 is arranged with a first limiting portion 213, and the movable wheel 22 is arranged with a second limiting portion 223; in a first state, the first limiting portion 213 is spaced apart from the second limiting portion 223, and the fixed wheel 21 rotates relative to the movable wheel 22; in a second state, the first limiting portion 213 abuts against the second limiting portion 223, and the fixed wheel 21 drives the movable wheel 22 to rotate synchronously.

Two ends of the movable rope 71 are connected to the gripping device 80 and the fixed wheel 21, respectively, and the fixed wheel 21 is configured to make the movable rope 71 coiled on the fixed wheel 21 by rotating; when the movable rope 71 is in a slack state, the gripping device 80 is in an open state; when the movable rope 71 is in a taut state, the gripping device 80 is in a closed state.

Two ends of the fixed rope 72 are connected to the gripping device 80 and the movable wheel 22, respectively, and the movable wheel 22 rotates to cause the fixed rope 72 to coil on the movable wheel 22 so as to control the lifting and lowering of the gripping device 80.

Specifically, an output shaft of the first motor 201 is transmission-connected to the first wheel train 202; when the first motor 201 is activated, it can drive the first wheel train 202 to rotate; the fixed wheel 21 is fixedly connected to the first transmission shaft 281 to realize synchronous rotation. In the first state, since the fixed wheel 21 and the movable wheel 22 are not in contact or are only slightly in contact, the force of the fixed wheel 21 on the movable wheel 22 is small, so the movable wheel 22 is basically unaffected by the fixed wheel 21, i.e., the movable wheel 22 does not rotate. In this process, the fixed wheel 21 may be rotated in a first direction such that a number of coils of the movable rope 71 on the fixed wheel 21 is reduced to be in the slack state, in which case the gripping device 80 is in the open state.

When the fixed wheel 21 is rotated by a certain angle in the first direction and is in the second state, the first limiting portion 213 abuts against the second limiting portion 223, thereby forcing the movable wheel 22 to overcome the force of a first resilient member 292 and rotate synchronously with the fixed wheel 21 in the first direction. In this process, the number of coils of the fixed rope 72 on the movable wheel 22 becomes less, and the gripping device 80 gradually descends, while the number of coils of the movable rope 71 on the fixed wheel 21 likewise becomes less.

When the number of coils of the movable rope 71 on the fixed rope 72 is 0, the movable rope 71 will be re-coiled on the fixed wheel 21 because the fixed wheel 21 continues to rotate in the first direction, and the movable rope 71 gradually becomes taut, causing the gripping device 80 to close.

When the number of coils of the fixed rope 72 on the movable wheel 22 is 0, the fixed rope 72 will be driven to be re-coiled on the movable wheel 22 because the movable wheel 22 continues to rotate in the first direction, and the gripping device 80 gradually rises.

When the number of coils of the movable rope 71 on the fixed wheel 21 is 0, the movable rope 71 will be re-coiled on the fixed wheel 21 because the fixed wheel 21 continues to rotate in the first direction, and the movable rope 71 gradually becomes taut, causing the gripping device 80 to close.

For the crane machine of the present disclosure, when the gripping device 80 descends, the gripping device 80 is opened to realize the grasping of the doll or other items; when the gripping device 80 is required to rise, the gripping device 80 is closed to grasp the doll. In this way, the opening and closing of the gripping device 80 can be changed with the lifting movement, that is, the lifting movement of the gripping device 80 and the opening and closing movement are controlled by the same motor. Therefore, there is no need to operate separately, and the two functions can be realized by only one operation. In this way, the operation of the gripping device 80 is simple and convenient, and the user experience is better, which is suitable for operation by smaller children.

Further, the crane machine further includes a first resilient member 292; in the first state, the first resilient member 292 abuts against the movable wheel 22 to restrict the movable wheel 22 from rotating with the fixed wheel 21. Specifically, in the first state, because the fixed wheel 21 and the movable wheel 22 are not in contact or are only slightly in contact, coupled with the limiting effect of the first resilient member 292 on the movable wheel 22, the force of the fixed wheel 21 on the movable wheel 22 is less than the force of the first resilient member 292 on the movable wheel 22; therefore, the movable wheel 22 is basically unaffected by the fixed wheel 21, i.e., the movable wheel 22 does not rotate. When the fixed wheel 21 is rotated by a certain angle along the first direction and is in the second state, the first limiting portion 213 and the second limiting portion 223 resist, thereby forcing the movable wheel 22 to overcome the force of the first resilient member 292 and synchronously rotate with the fixed wheel 21 along the first direction.

Of course, in other embodiments, the first resilient member 292 may be replaced with a spacer or other structure with a larger surface roughness that may provide a resistance to the movable wheel 22, thereby preventing the movable wheel 22 from rotating in the first state.

Figure 12:
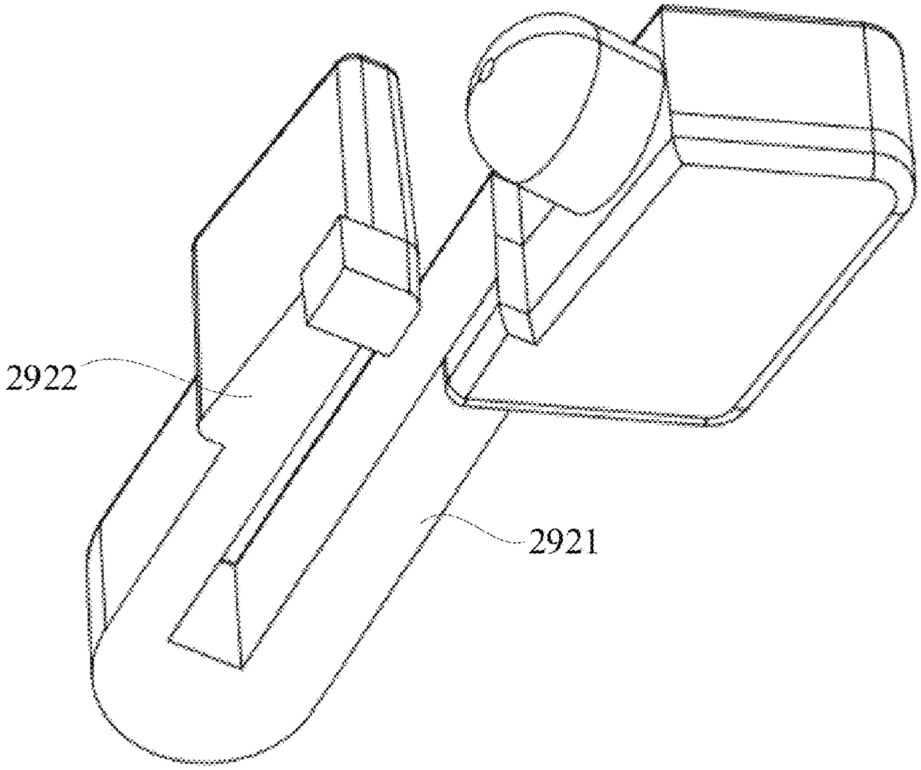
FIG. 12 is a structural schematic view of a resilient arm in FIG. 7.

Referring to FIG. 12 in conjunction, in some embodiments, the crane machine further includes a second housing 60, and the first driving unit 20 is disposed within the second housing 60. The first resilient member 292 includes a resilient arm and a spring (not shown); the resilient arm includes a first resilient segment 2921 and a second resilient segment 2922, where the first resilient segment 2921 abuts against a peripheral surface of the movable wheel 22, and the second resilient segment 2922 abuts against the second housing 60; an end of the spring abuts against the first resilient segment 2921, and the other end of the spring abuts against the second resilient segment 2922 or the second housing 60; when the first resilient segment 2921 is squeezed, the first resilient segment 2921 may approach the second resilient segment 2922. In the embodiments, the resilient arm is arranged in a U-shape or V-shape. Specifically, in the first state, the first resilient segment 2921 abuts against the peripheral surface of the movable wheel 22, preventing the movable wheel 22 from rotating, in which case the spring is in a compressed state and has a tendency to push the first resilient segment 2921 against the peripheral surface of the movable wheel 22, such that the first resilient segment 2921 exerts a greater resistance to the movable wheel 22. In the second state, the movable wheel 22 is driven by the fixed wheel 21 to generate a greater rotational force, forcing the first resilient segment 2921 to generate a resilient deformation, and the first resilient segment 2921 squeezes the spring in a direction close to the second resilient segment 2922.

In other embodiments, the first resilient member 292 may include a spring and an offset block; an end of the spring is connected to the second housing 60 and the other end of the spring is connected to the offset block, and the offset block abuts against the peripheral surface of the movable wheel 22.

Figure 13:
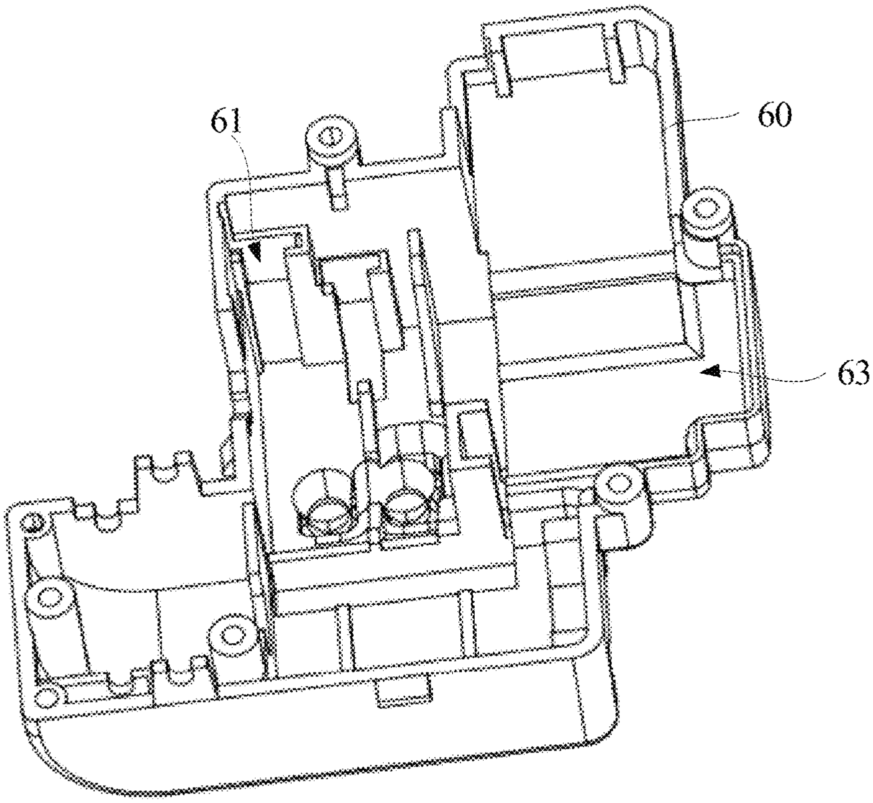
FIG. 13 is a structural schematic view of a second housing in FIG. 6.

Referring to FIG. 13, in some embodiments, the second housing 60 defines a holding groove 61, the holding groove 61 having a first slot and a second slot; the second resilient segment 2922 is seated in the holding groove 61 from the first slot, and the second slot is opened towards the first resilient segment 2921.

In addition, the second housing 60 is arranged to provide an accommodation space for the first driving unit 20, which facilitates the overall setting of the first driving unit 20.

Referring to FIGS. 8 to 11 together, in some embodiments, the first limiting portion 213 is arranged on a side of the fixed wheel 21 facing the movable wheel 22, the second limiting portion 223 is arranged on a side of the movable wheel 22 facing the fixed wheel 21, and the first limiting portion 213 and the second limiting portion 223 are each arranged as a protrusion. The first limiting portion 213 and the second limiting portion 223 are distributed on a circular reference line, and a circle center of the circular reference line is located on a rotation axis of the fixed wheel 21. An end surface of the fixed wheel 21 and an end surface of the movable wheel 22 are spaced apart, such that the fixed wheel 21 can rotate relative to the movable wheel 22, and when rotated by a certain angle, the first limiting portion 213 and the second limiting portion 223 come into contact, and the first limiting portion 213 will push against the second limiting portion 223 to rotate together, whereby the movable wheel 22 rotates together following the fixed wheel 21. When the fixed wheel 21 is rotated in the opposite direction, the first limiting portion 213 disengages from the second limiting portion 223, whereby the fixed wheel 21 is again rotated alone until it again abuts against the second limiting portion 223 and rotates together.

In some embodiments, the fixed wheel 21 may be arranged with two first limiting portions 213, the two first limiting portions 213 being distributed on a same circular reference line, and an angle between the two first limiting portions 213 being 180°. The movable wheel 22 may be arranged with two second limiting portions 223, the two second limiting portions 223 being distributed on a same circular reference line, and an angle between the two second limiting portions 223 being 180°. Therefore, the fixed wheel 21 can drive the movable wheel 22 to rotate synchronously after rotating 90° in any direction.

In other embodiments, the first limiting portion 213 is arranged as a protrusion, the second limiting portion 223 is arranged as an arcuate groove, and the first limiting portion 213 can move in the arcuate groove, and can push the movable wheel 22 to synchronously rotate when abutting against a groove wall of the arcuate groove.

Referring again to FIGS. 5, 8, and 9, in some embodiments, the fixed wheel 21 includes a first wheel body 211 and a second wheel body 212 disposed along its rotation axis; the first wheel body 211 defines a first groove 2111, and the second wheel body 212 defines a second groove 2121, with the first groove 2111 and the second groove 2121 being disposed opposite each other; the movable rope 71 includes a first rope body 711 and multiple first spheres 712 sequentially disposed on the first rope body 711, where a part of one of the first spheres 712 is disposed in the first groove 2111 and the other part is disposed in the second groove 2121; the first spheres 712 can movably cooperate with the first groove 2111 and the second groove 2121. In this way, the first spheres 712 form a ball bearing-like form within the first groove 2111 and the second groove 2121 to prevent seizing.

Further, the first wheel body 211 is arranged with an insertion post 2112, and the second wheel body 212 defines an insertion slot 2122 or a socket for the insertion post 2112 to be adaptedly inserted for positioning and mounting. In addition, the first wheel body 211 may be arranged with a protrusion, which abuts against the second wheel body 212, such that the first wheel body 211 and the second wheel body 212 are spaced apart from each other, and the first groove 2111 and the second groove 2121 are also spaced apart along the rotation axis of the fixed wheel 21, and this spacing can allow the first rope body 711 to protrude.

Figure 5:
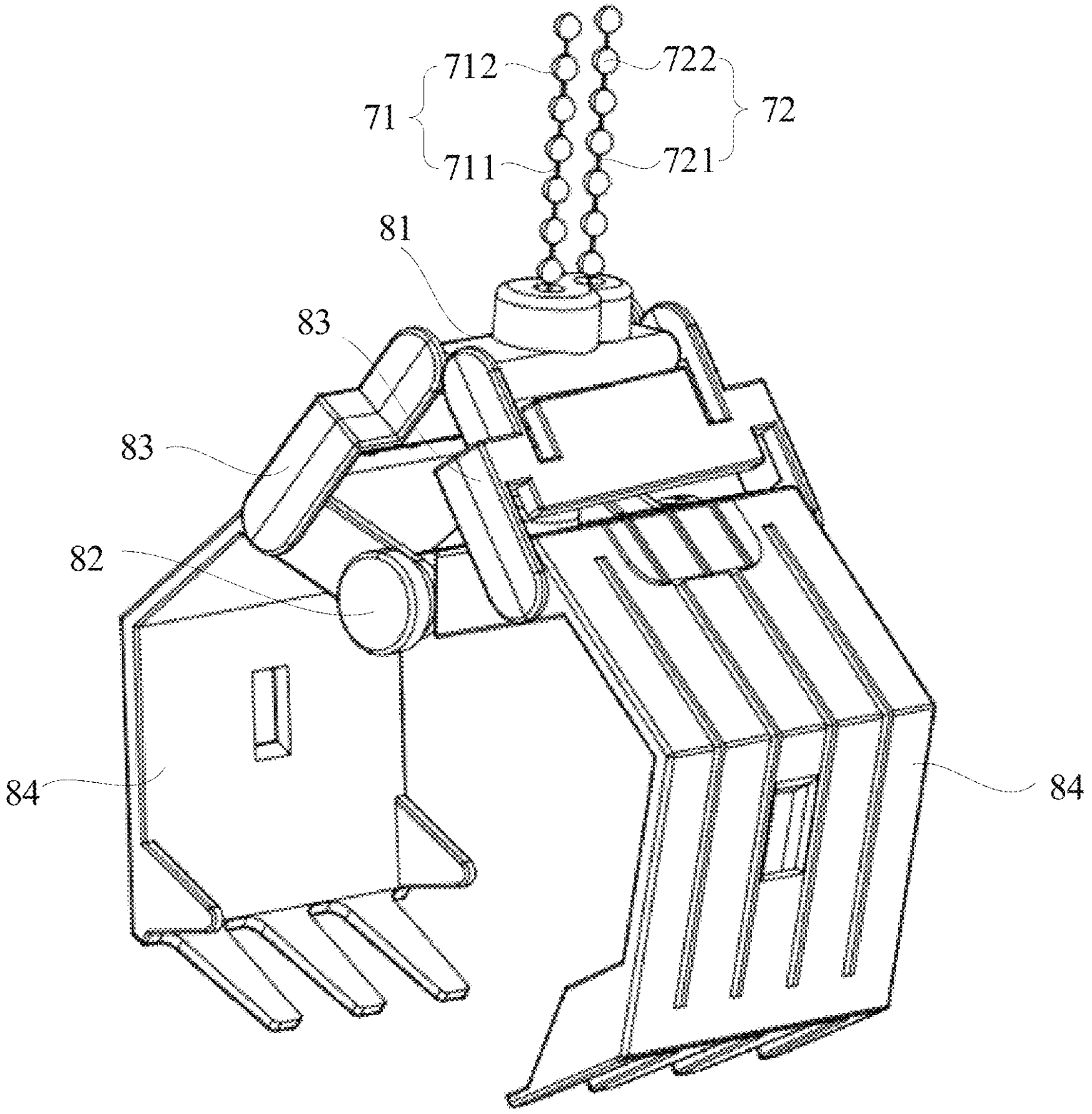
FIG. 5 is a structural schematic view of a gripping device in FIG. 4.
Figure 10:
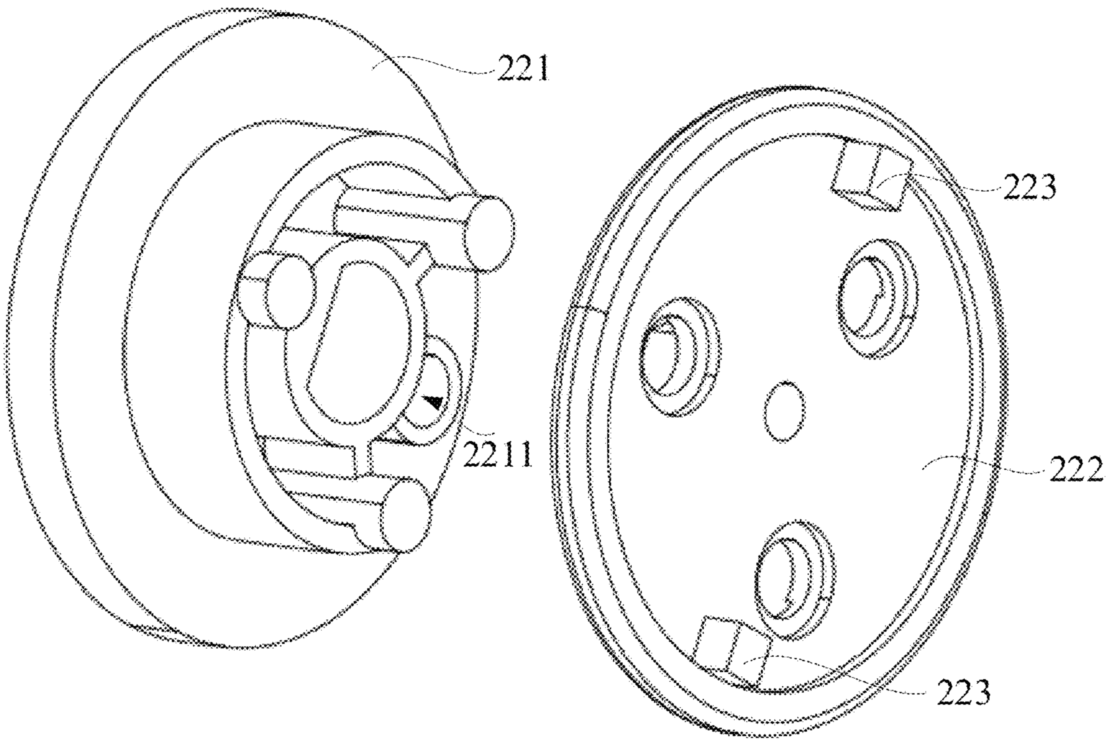
FIG. 10 is a decomposed schematic view of a movable wheel in FIG. 7.
Figure 11:
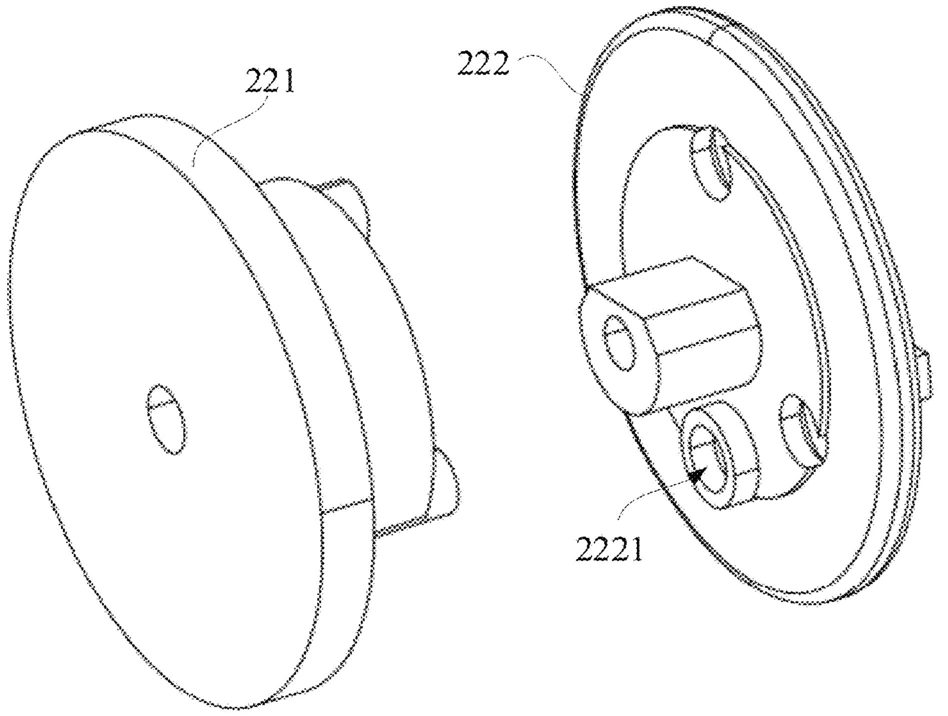
FIG. 11 is a decomposed schematic view of the movable wheel in FIG. 10 at another viewing angle.

Referring to FIG. 5, FIG. 10 and FIG. 11, similarly, in some embodiments, the movable wheel 22 includes a third wheel body 221 and a fourth wheel body 222 disposed along its rotation axis; the third wheel body 221 defines a third groove 2211 and the fourth wheel body 222 defines a fourth groove 2221, with the third groove 2211 and the fourth groove 2221 being disposed opposite each other; the fixed rope 72 includes a second rope body 721 and multiple second spheres 722 sequentially disposed on the second rope body 721, where a part of one of the second spheres 722 is disposed in the third groove 2211 and the other part is disposed in the fourth groove 2221; the second spheres 722 can movably cooperate with the third groove 2211 and the fourth groove 2221. In this way, the second spheres 722 form a ball bearing-like form within the third groove 2211 and the fourth groove 2221 to prevent seizing.

Referring again to FIG. 7, in some embodiments, the first wheel train 202 includes a first gear 23, a second gear 25, a third gear 26, a fourth gear 27, and a second transmission shaft 282. The first gear 23 is movably connected to the first transmission shaft 281, and the second gear 25 is fixedly connected to the first transmission shaft 281. The third gear 26 is movably connected to the second transmission shaft 282 to be able to rotate and move axially around the second transmission shaft 282, and the fourth gear 27 is fixedly connected to the second transmission shaft 282. The first gear 23 engages with an output shaft of the first motor 201 and the third gear 26, respectively, and the second gear 25 engages with the fourth gear 27. In a first motion state, the third gear 26 and the fourth gear 27 rotate synchronously by abutting against each other; in a first locked state, the third gear 26 rotates and the fourth gear 27 stops rotating.

Specifically, after the first motor 201 is activated, the output shaft of the first motor 201 drives the first gear 23 to rotate, the first gear 23 drives the third gear 26 to rotate, the fourth gear 27 rotates synchronously by abutting against the third gear 26, and the fourth gear 27 drives the second gear 25 to rotate; since the second gear 25 is fixed to the first transmission shaft 281, the first transmission shaft 281 rotates therewith, and the fixed shaft 281 fixed to the first transmission shaft 281 also rotates together.

When the gripping device 80 moves upward to a limit position, the fixed rope 72 and the movable rope 71 can no longer be extended or shortened, in which case the fixed wheel 21 and the movable wheel 22 can no longer be rotated, i.e., the first transmission shaft 281 stops rotating, and the second gear 25 and the fourth gear 27 are also forced to stop rotating. Since the first motor 201 is still in operation, meaning that the first gear 23 continues to rotate, the third gear 26 rotates around the second transmission shaft 282 driven by the first gear 23, and the third gear 26 moves along the second transmission shaft 282 to avoid contacting the fourth gear 27.

Further, an end of the third gear 26 back away from the fourth gear 27 is further arranged with a second resilient member (not shown); in the first motion state, the second resilient member is in a compressed state to push the third gear 26 against the fourth gear 27; in the first locked state, the third gear 26 may squeeze the second resilient member in a direction away from the fourth gear 27, thereby allowing the third gear 26 to rotate relative to the fourth gear 27. In some embodiments, the second resilient member is a spring or another resilient structure such as silicone or sponge. When the third gear 26 continues to rotate and the fourth gear 27 is forced to stop rotating, since the second resilient member has elasticity, the second resilient member can reduce the contact between the third gear 26 and the fourth gear 27 through deformation, thereby avoiding the third gear 26 from jamming.

Further, the third gear 26 and the fourth gear 27 may each be fixed with a spacer (taking a spacer of the first wheel train 202 as a first spacer 291), the two first spacers 291 are disposed between the third gear 26 and the fourth gear 27, and surfaces of the two first spacers 291 facing each other have large roughness and can be respectively pressed against each other, so as to have larger friction, causing the third gear 26 to drive the fourth gear 27 to rotate synchronously. When the fourth gear 27 stops rotating, the third gear 26 may move toward the spring, thereby causing the squeezing force between the two first spacers 291 to decrease or disappear, avoiding interference between the two first spacers 291, and avoiding the third gear 26 from jamming. In the embodiments, the third gear 26 and the fourth gear 27 abut against each other by the first spacers 291. Of course, in other embodiments, the third gear 26 and the fourth gear 27 may be in direct contact with each other, and the contact surfaces thereof are set as rough surfaces.

In some embodiments, the first gear 23 may include a large gear segment 231 and a small gear segment 232 disposed coaxially, with an outer diameter of the large gear segment 231 being greater than an outer diameter of the small gear segment 232. The large gear segment 231 engages with the output shaft of the first motor 201, and the small gear segment 232 engages with the third gear 26.

After the first wheel train 202 is set to the above structure, when the first motor 201 continues to rotate and the gripping device 80 reaches the limit position, the first motor 201 can be prevented from jamming and rattling by the rotation of the third gear 26.

Of course, in other embodiments, the first wheel train 202 may be arranged in the form of a reduction gear only.

Referring again to FIG. 5, in some embodiments, the gripping device 80 includes: a fixed rod 81, a movable rod 82, two connection arms 83, and two gripping arms 84; the fixed rod 81 and the movable rod 82 are substantially horizontally disposed; the fixed rod 81 is disposed above the movable rod 82, and the fixed rod 81 and the movable rod 82 are disposed side-by-side; a lower end of the fixed rope 72 is connected to the fixed rod 81, and a lower end of the movable rope 71 is connected to the movable rod 82. The two gripping arms 84 are disposed on two opposite sides of the movable rod 82; an upper end of each gripping arm 84 can rotatably cooperate with the movable rod 82, and the gripping arm 84 is rotatable relative to the movable rod 82 such that the lower ends of the two gripping arms 84 can be closed together or far away from each other in an open state. An upper end of each connection arm 83 is rotatably connected to the fixed rod 81, and a lower end of the connection arm 83 is rotatably connected to the gripping arm 84; the two connection arms 83 and the two gripping arms 84 are in a one-to-one correspondence.

Specifically, when the movable rope 71 is in the slack state, the movable rod 82 falls relative to the fixed rod 81 under the action of gravity, in which case the lower ends of the two gripping arms 84 are opened. When the movable rope 71 is in the taut state, the movable rod 82 is pulled upwardly by the movable rope 71 until coming into contact with the fixed rod 81, in which case the lower ends of the two gripping arms 84 are closed.

Figure 14:
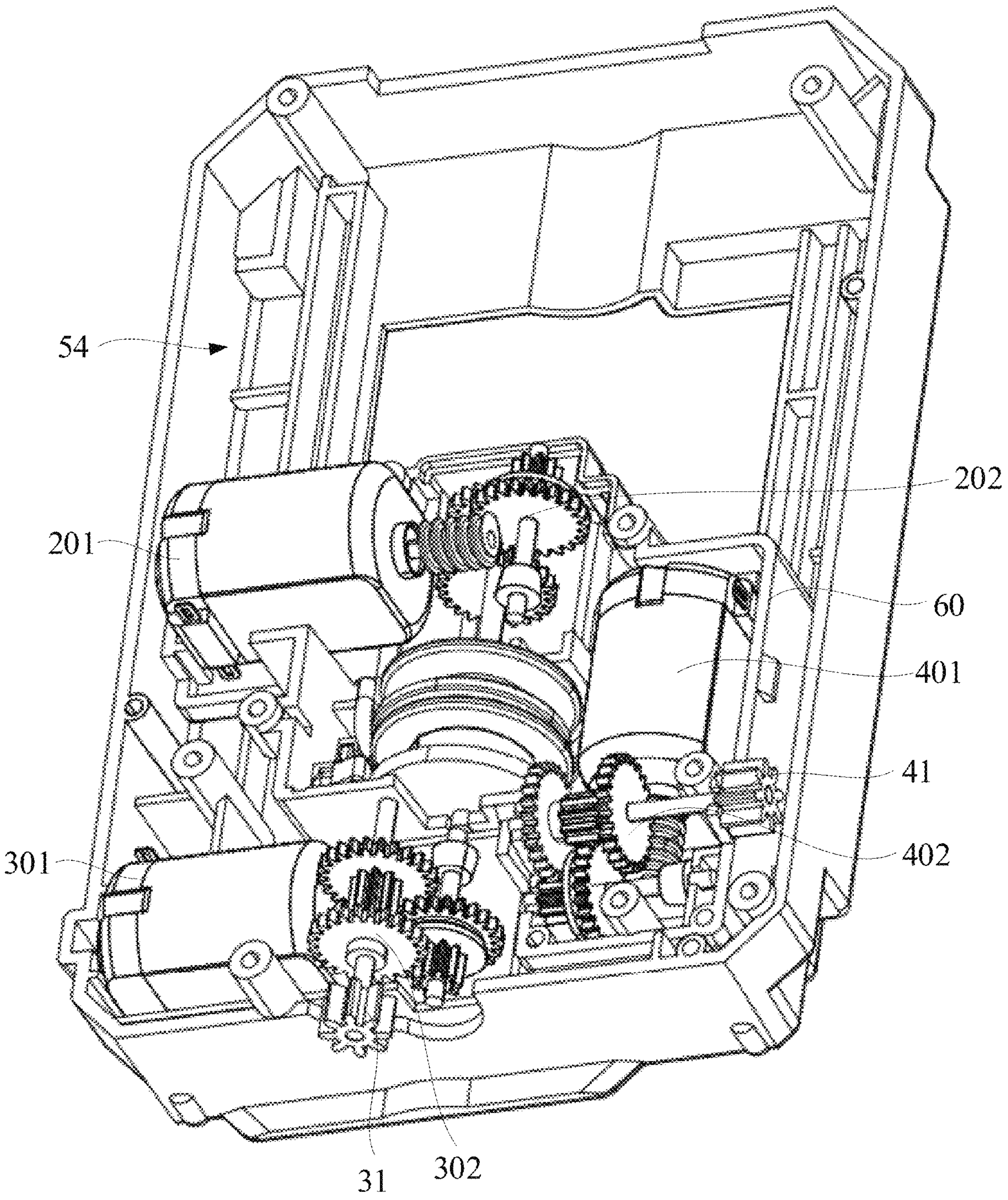
FIG. 14 is a schematic view of another internal structure in FIG. 4.
Figure 15:
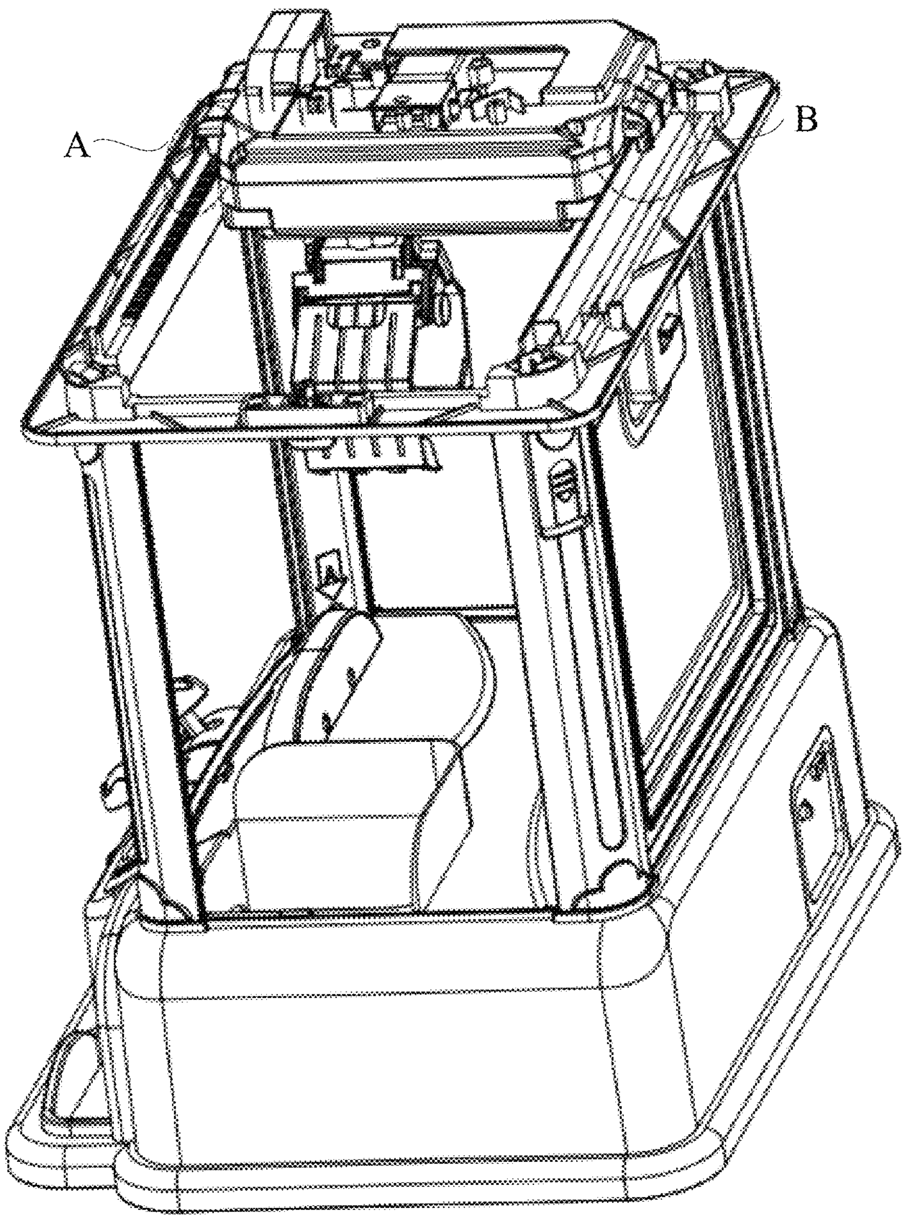
FIG. 15 is a partial structural schematic view of the crane machine in FIG. 1.
Figure 16:
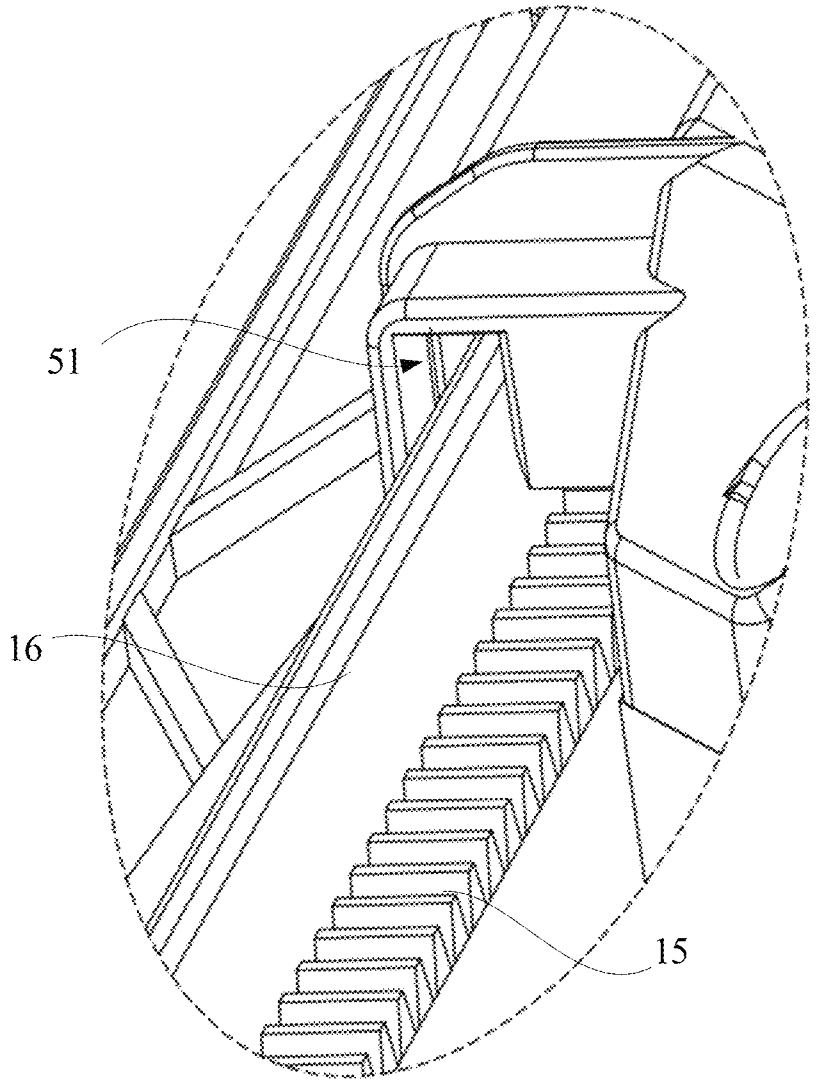
FIG. 16 is an enlarged view at area A in FIG. 15.

Referring to FIGS. 14 to 16, the crane machine further includes a second driving unit 30; the second driving unit 30 includes a second motor 301 and a second wheel train 302; the second wheel train 302 includes a first mating gear 31, the main body 10 includes a first rack 15 extending along a first horizontal direction, the first mating gear 31 engages with the first rack 15, and the second motor 301 is capable of driving the first mating gear 31 to rotate to cause the second driving unit 30 to move in the first horizontal direction.

Figure 4:
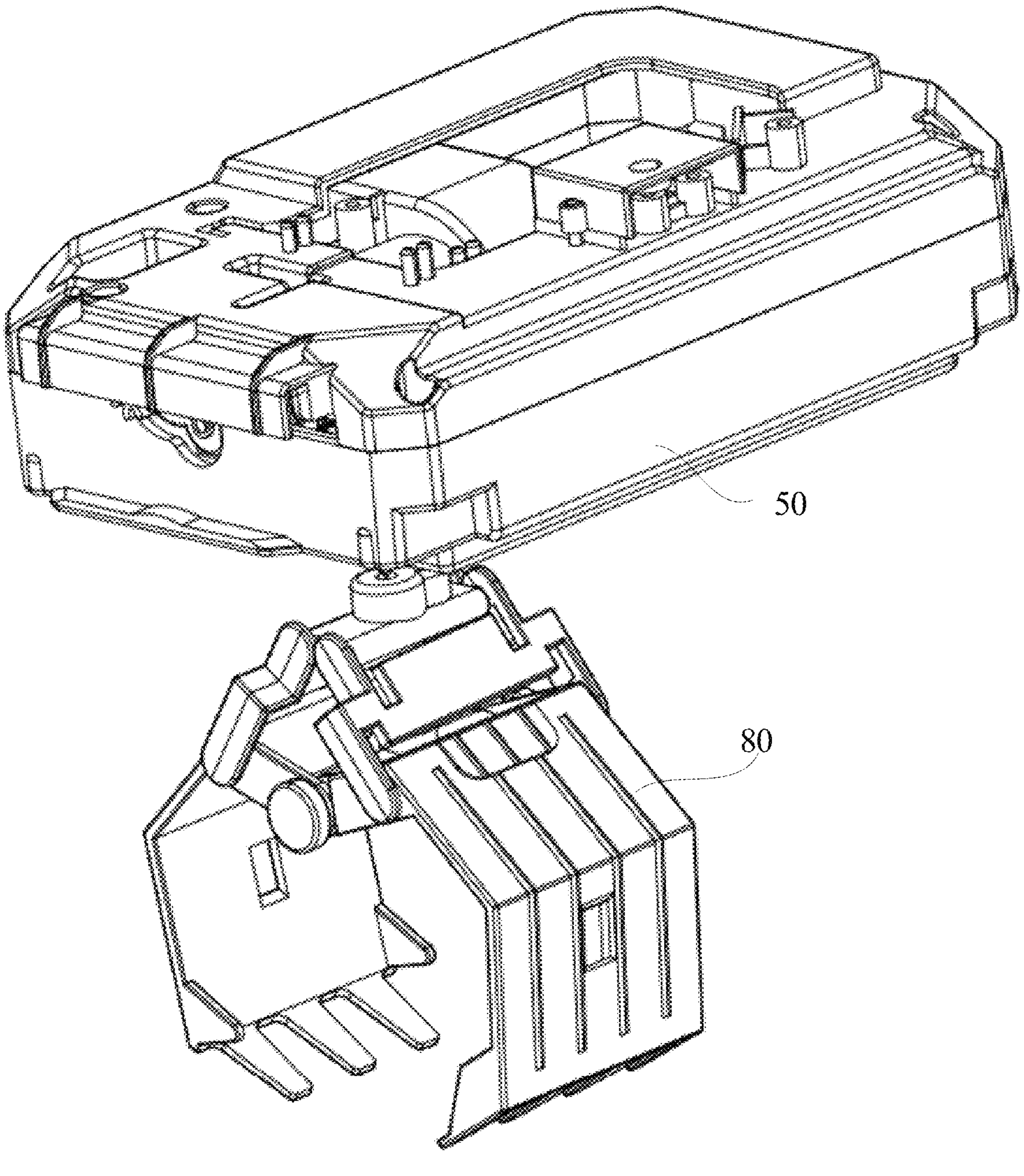
FIG. 4 is a partial structural schematic view of the crane machine in FIG. 1.

Further, the crane machine further includes a first housing 50 (as shown in FIG. 4), the first housing 50 being arranged at a top of the storage cavity 141; the first driving unit 20 is arranged on the first housing 50, and the second driving unit 30 is fixed to the first housing 50, such that when the second driving unit 30 is moved in the first horizontal direction, the first housing 50 may drive the first driving unit 20 to move along the first horizontal direction, thereby causing the entire gripping device 80 to move in the first horizontal direction. In other embodiments, the second driving unit 30 and the first driving unit 20 may be connected by a guide rod or other structures, as long as it is ensured that the second driving unit 30 can drive the first driving unit 20 to move left and right.

Figure 17:
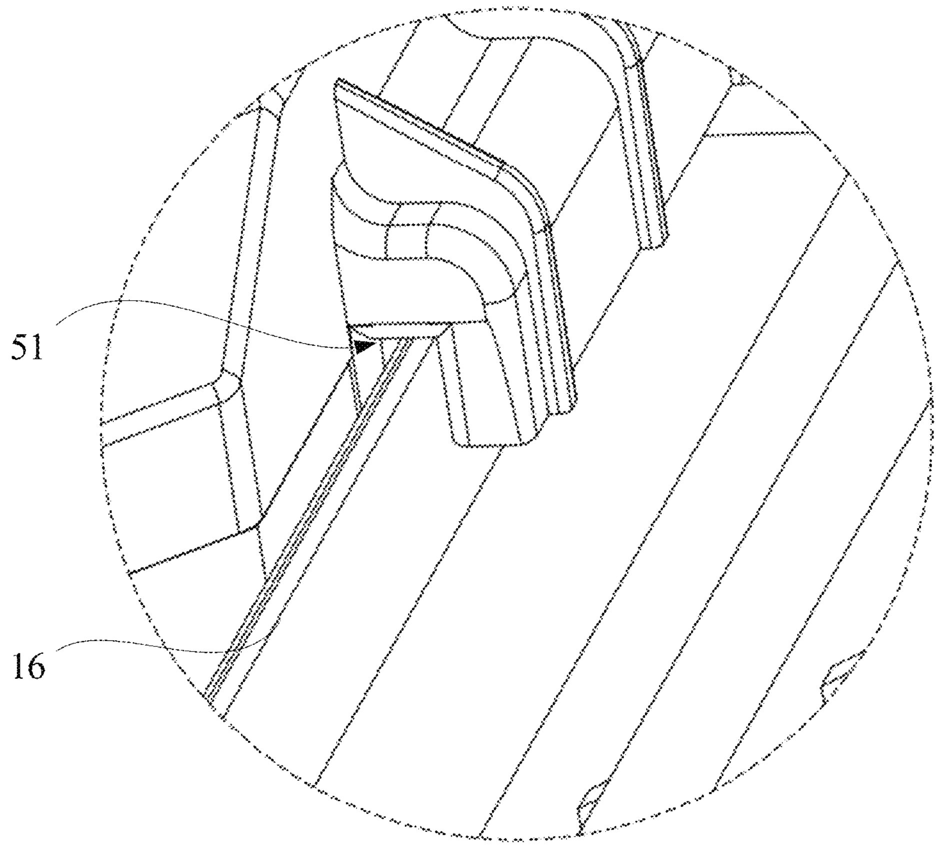
FIG. 17 is an enlarged view at area B in FIG. 15.

Referring to FIGS. 16 and 17, in some embodiments, a guide groove 51 is defined on a front and/or back side of the first housing 50, the guide groove 51 extending in the first horizontal direction; the main body 10 is formed with a guide rail 16 to cooperate with the guide groove 51. Specifically, the guide grooves 51 are defined on the front side and the back side of the first housing 50, respectively, with openings of the guide grooves 51 being downwardly oriented, and the guide rails 16 are formed on both the front side and the back side of the main body 10, with the guide groove 51 on the front side slidably cooperating with the guide rail 16 on the front side in the first horizontal direction, and the guide groove 51 on the back side slidably cooperating with the guide rail 16 on the back side in the first horizontal direction.

The first rack 15 may be a structure separately arranged on the body 10, or, the main body 10 is formed with the first rack 15 by providing multiple serrations.

Figure 18:
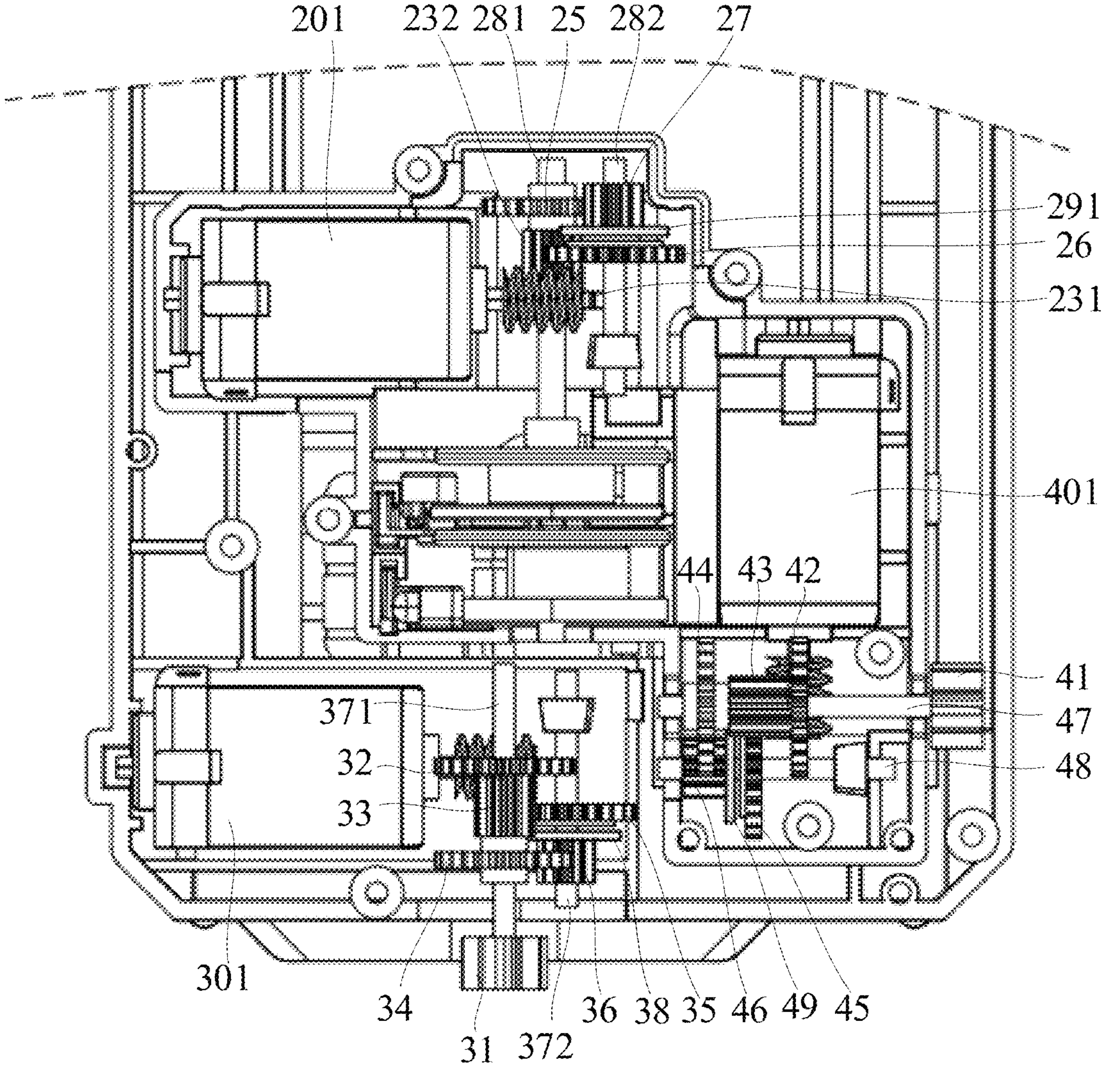
FIG. 18 is a plan view of the structure shown in FIG. 14.

Referring to FIG. 18, in some embodiments, the second wheel train 302 includes a sixth gear 32, a seventh gear 33, an eighth gear 34, a ninth gear 35, a tenth gear 36, a third transmission shaft 371, and a fourth transmission shaft 372. The sixth gear 32 and the seventh gear 33 are fixed to each other and movably connected to the third transmission shaft 371, respectively; the eighth gear 34 and the first mating gear 31 are fixedly connected to the third transmission shaft 371, respectively. The ninth gear 35 is movably connected to the fourth transmission shaft 372 to be able to rotate and axially move around the fourth transmission shaft 372, and the tenth gear 36 is fixedly connected to the fourth transmission shaft 372. The sixth gear 32 engages with an output shaft of the second motor 301, the seventh gear 33 engages with the ninth gear 35, and the eighth gear 34 engages with the tenth gear 36. In a second motion state, the ninth gear 35 and the tenth gear 36 rotate synchronously by abutting against each other; in a second locked state, the ninth gear 35 rotates and the tenth gear 36 stops rotating.

Specifically, after the second motor 301 is activated, the output shaft of the second motor 301 drives the sixth gear 32 to rotate, the seventh gear 33 drives the ninth gear 35 to rotate, the tenth gear 36 rotates synchronously by pushing against the ninth gear 35, and the tenth gear 36 drives the eighth gear 34 to rotate; since the eighth gear 34 is fixed to the third transmission shaft 371, the third transmission shaft 371 rotates therewith, and the first mating gear 31 fixed to the third transmission shaft 371 also rotates together.

When the first mating gear 31 moves to a limit position of the left end or the right end, it can no longer rotate, that is, the third transmission shaft 371 stops rotating, and the eighth gear 34 and the tenth gear 36 are also forced to stop rotating.

Since the second motor 301 is still in operation, meaning that the sixth gear 32 and the seventh gear 33 continue to rotate, the ninth gear 35 rotates around the fourth transmission shaft 372 driven by the seventh gear 33, and the ninth gear 35 moves along the fourth transmission shaft 372 to avoid contacting the tenth gear 36.

Further, an end of the ninth gear 35 back away from the tenth gear 36 is further arranged with a spring; in the second motion state, the spring is in a compressed state to push the ninth gear 35 against the tenth gear 36; in the second locked state, the ninth gear 35 may squeeze the spring in a direction away from the tenth gear 36, thereby allowing the ninth gear 35 to rotate relative to the tenth gear 36.

Further, the ninth gear 35 and the tenth gear 36 may each be fixed with a second spacer 38, the two second spacers 38 are disposed between the ninth gear 35 and the tenth gear 36, and surfaces of the two second spacers 38 facing each other have large roughness and can be respectively pressed against each other, so as to have larger friction, causing the ninth gear 35 to drive the tenth gear 36 to rotate synchronously. When the tenth gear 36 stops rotating, the ninth gear 35 may move toward the spring, thereby causing the squeezing force between the two second spacers 38 to decrease or disappear, avoiding interference between the two second spacers 38, and avoiding the ninth gear 35 from jamming. In the embodiments, the ninth gear 35 and the tenth gear 36 abut against each other by the second spacers 38. Of course, in other embodiments, the ninth gear 35 and the tenth gear 36 may be in direct contact with each other, and the contact surfaces thereof are set as rough surfaces.

After the first wheel train 202 is set to the above structure, when the second motor 301 continues to rotate and the gripping device 80 reaches the limit position, the second motor 301 can be prevented from jamming and rattling by the rotation of the ninth gear 35.

Of course, in other embodiments, the second wheel train 302 may be arranged in the form of a reduction gear only.

Figure 19:
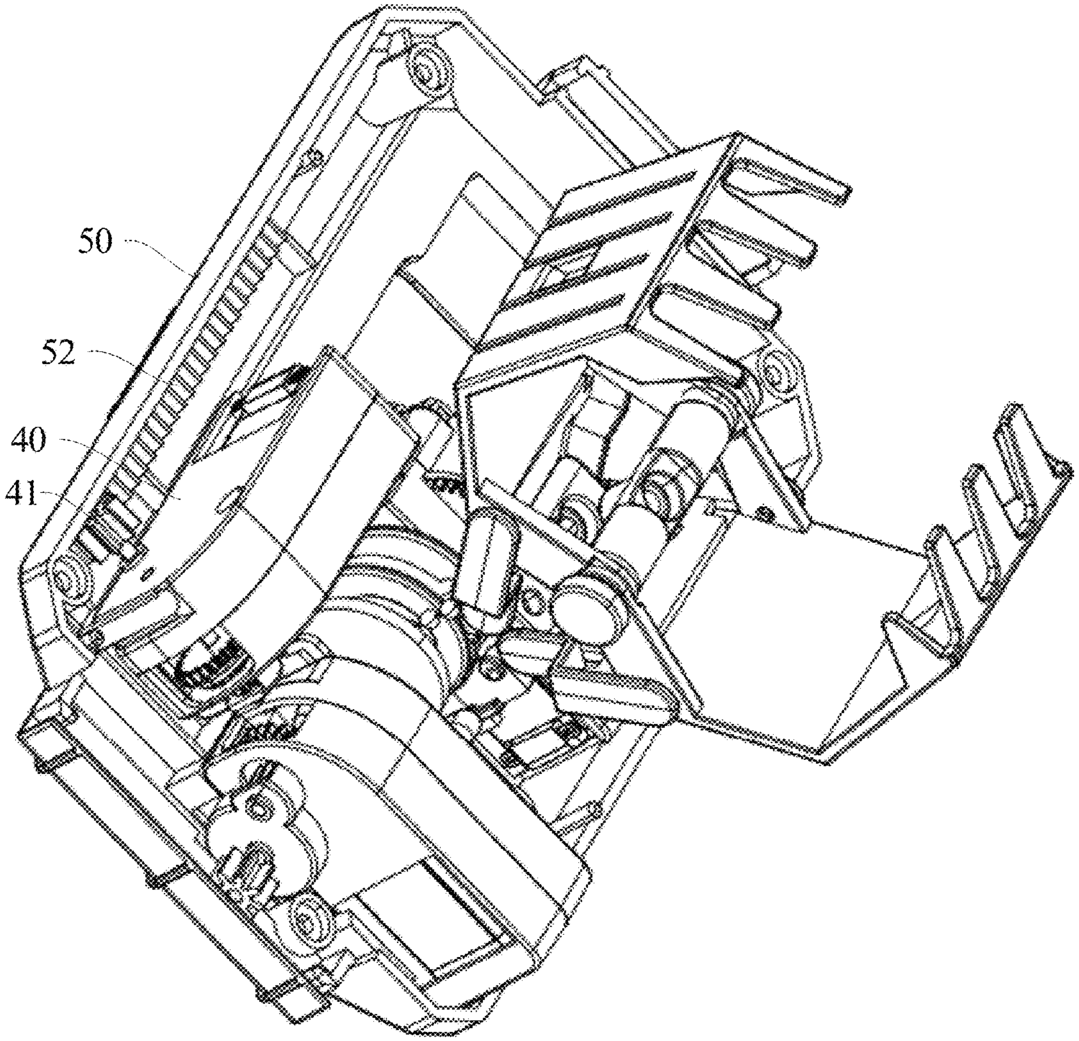
FIG. 19 is another schematic view of an internal structure in FIG. 4, viewed from bottom to top.

Referring to FIGS. 18 and 19, the crane machine further includes a third driving unit 40 fixed relative to the first driving unit 20; the third driving unit 40 includes a third motor 401 and a third wheel train 402; the third wheel train 402 includes a second mating gear 41, and the first housing 50 includes a second rack 52, the second rack 52 extending in a second horizontal direction; the second mating gear 41 engages with the second rack 52, and the third motor 401 is capable of driving the second mating gear 41 to rotate to cause the third driving unit 40 and the first driving unit 20 to move in the second horizontal direction. Specifically, the first driving unit 20 and the third driving unit 40 can move left and right driven by the second driving unit 30, and the first driving unit 20 can further move back and forth driven by the third driving unit 40.

Figure 6:
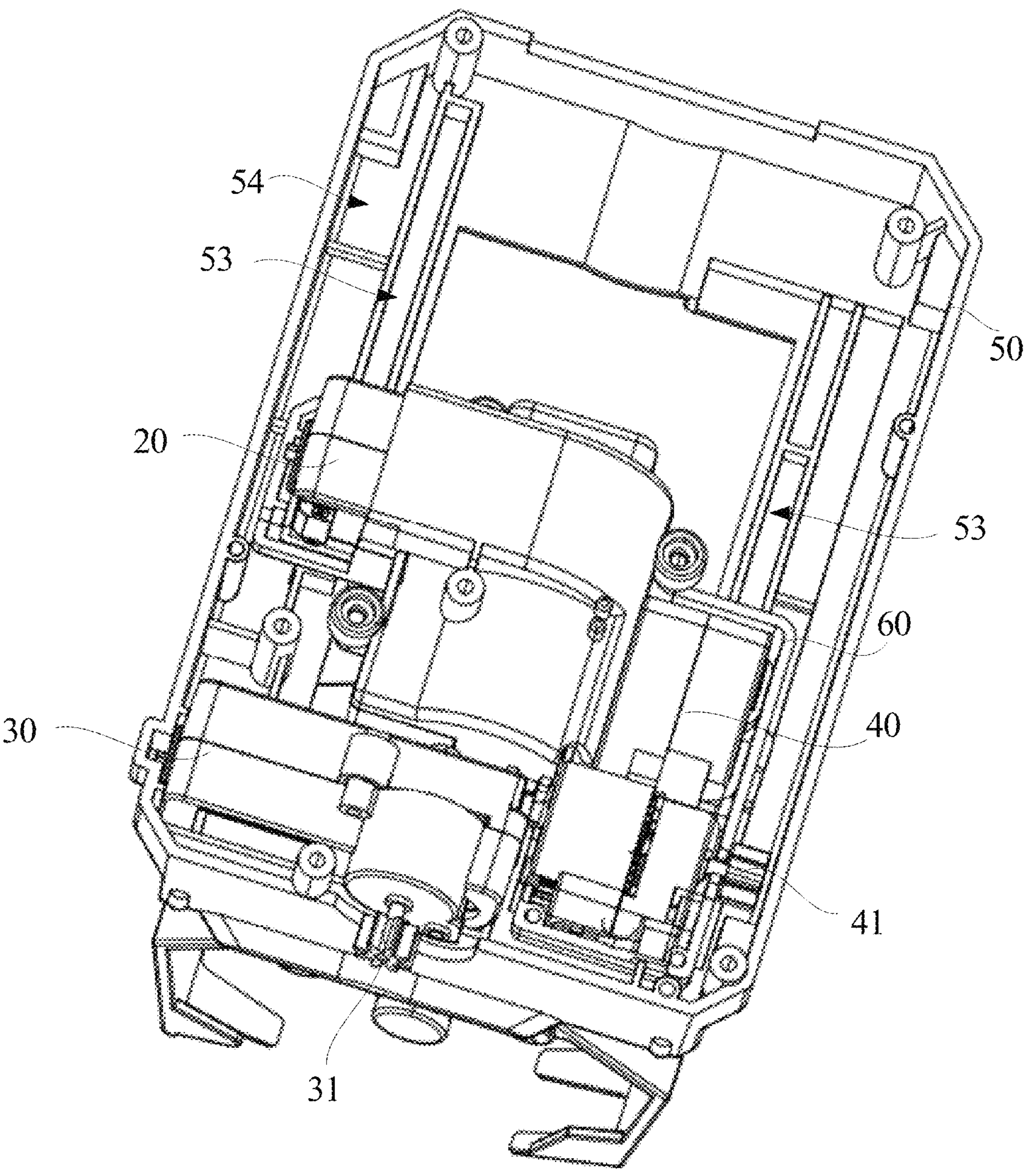
FIG. 6 is a schematic view of an internal structure in FIG. 4.
Figure 7:
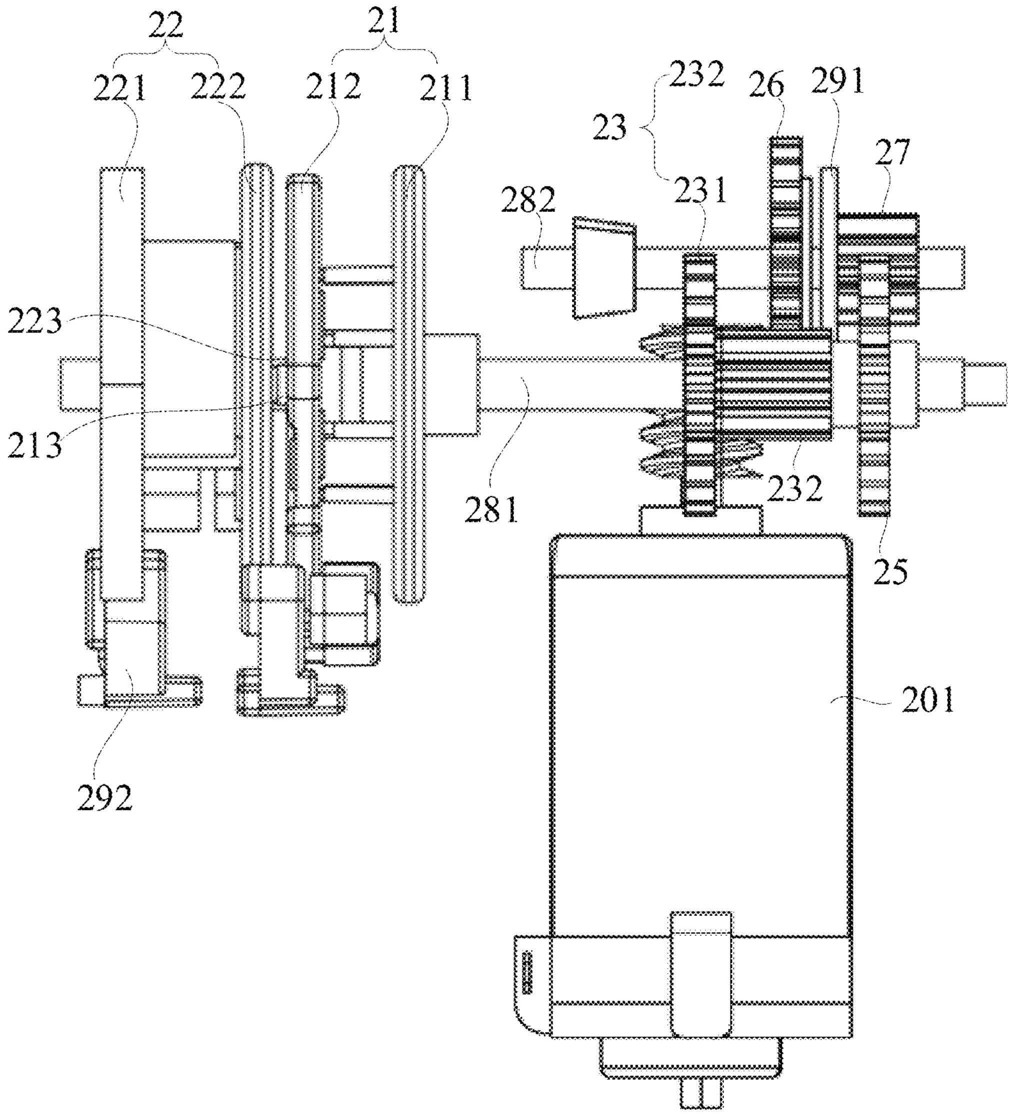
FIG. 7 is a structural schematic view of a first driving unit in FIG. 6.
Figure 8:
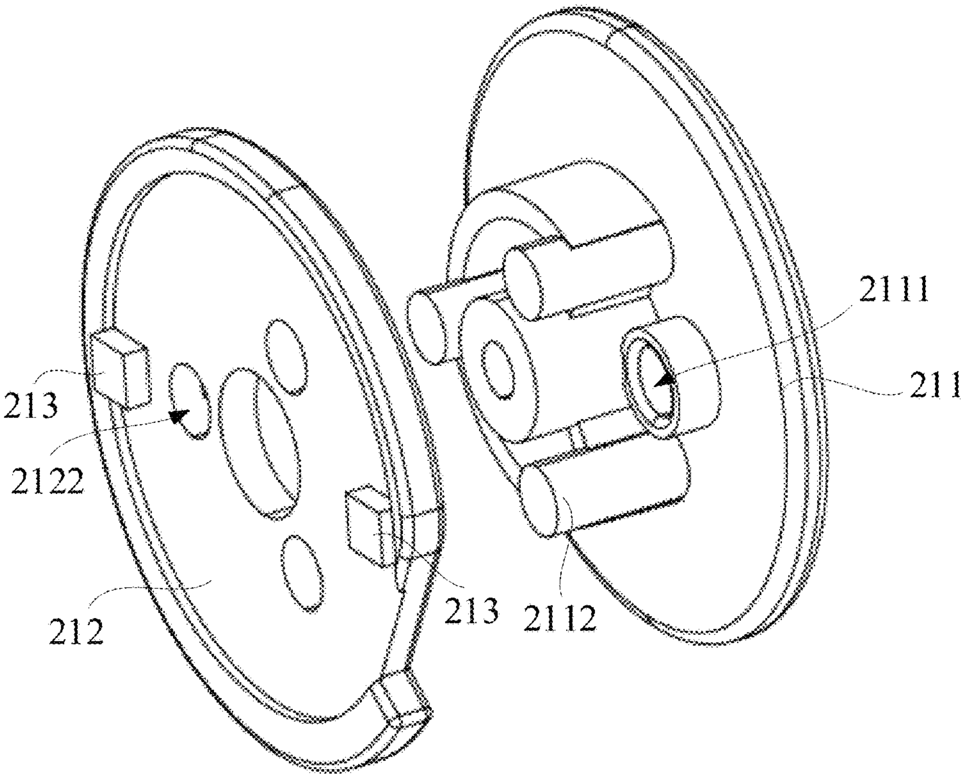
FIG. 8 is a decomposed schematic view of a fixed wheel in FIG. 7.
Figure 9:
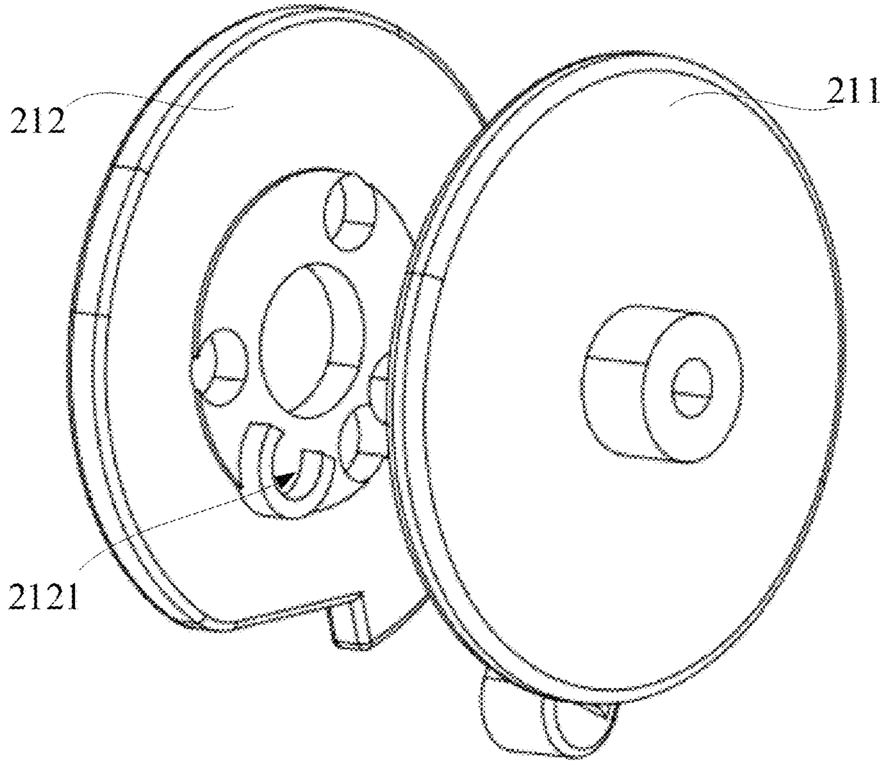
FIG. 9 is a decomposed schematic view of the fixed wheel in FIG. 8 at another viewing angle.
Figure 20:
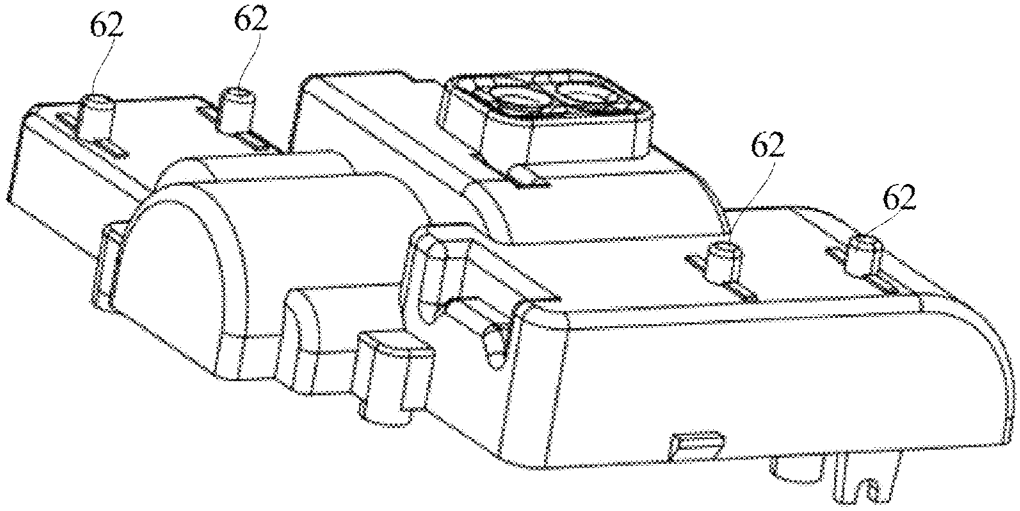
FIG. 20 is another structural schematic view of a second housing in FIG. 6.

Referring to FIGS. 6 and 20, in some embodiments, a bottom surface of the third driving unit 40 is arranged with a pillar 62, and the first housing 50 defines a sliding groove 53 extending in the second horizontal direction; the pillar 62 is capable of moving back and forth along the sliding groove 53. The cooperation between the pillar 62 and the sliding groove 53 may reduce the contact area between the third driving unit 40 and the first housing 50, thereby reducing the resistance of the back-and-forth movement. In addition, the sliding groove 53 further serves as a guide to direct the third driving unit 40 to move in the second horizontal direction.

Specifically, the pillar 62 is arranged on a bottom surface of the second housing 60.

The second rack 52 may be a structure separately arranged on the first housing 50; or, the second rack 52 is formed on the first housing 50 by providing multiple serrations.

The first horizontal direction and the second horizontal direction intersect, e.g., they are at an angle of 90° or an angle of less than 90°. In some embodiments, the first horizontal direction is a left-right direction and the second horizontal direction is a front-back direction.

Further, the crane machine includes a second housing 60, the first housing 50 defines a mounting cavity 54, and the second housing 60 and the second driving unit 30 are disposed in the mounting cavity 54; the second housing 60 defines a mounting groove 63, and the first driving unit 20 and the third driving unit 40 are fixed in the mounting groove 63. The setting of the second housing 60 may enable the first driving unit 20 and the third driving unit 40 to form an integral module to realize synchronous movement back and forth.

In some embodiments, the third wheel train 402 includes an eleventh gear 42, a twelfth gear 43, a thirteenth gear 44, a fourteenth gear 45, a fifteenth gear 46, a fifth transmission shaft 47, and a sixth transmission shaft 48. The eleventh gear 42 and the twelfth gear 43 are fixed and movably connected to the fifth transmission shaft 47, respectively, and the thirteenth gear 44 and the second mating gear 41 are fixedly connected to the fifth transmission shaft 47, respectively. The fourteenth gear 45 is movably connected to the sixth transmission shaft 48, and the fifteenth gear 46 is fixedly connected to the sixth transmission shaft 48. The eleventh gear 42 engages with an output shaft of the third motor 401, the twelfth gear 43 engages with the fourteenth gear 45, and the thirteenth gear 44 engages with the fifteenth gear 46. In a third motion state, the fourteenth gear 45 and the fifteenth gear 46 rotate synchronously by abutting against each other; in a third locked state, the fourteenth gear 45 rotates and the fifteenth gear 46 stops rotating.

Specifically, after the third motor 401 is activated, the output shaft of the third motor 401 drives the eleventh gear 42 to rotate, the twelfth gear 43 drives the fourteenth gear 45 to rotate, the fifteenth gear 46 rotates synchronously by pushing against the fourteenth gear 45, and the fifteenth gear 46 drives the thirteenth gear 44 to rotate; since the thirteenth gear 44 is fixed to the fifth transmission shaft 47, the fifth transmission shaft 47 rotates therewith, and the second mating gear 41 fixed to the fifth transmission shaft 47 also rotates together.

When the second mating gear 41 moves to a limit position of the front end or the back end, it can no longer rotate, that is, the fifth transmission shaft 47 stops rotating, and the thirteenth gear 44 and the fifteenth gear 46 are also forced to stop rotating. Since the third motor 401 is still in operation, meaning that the eleventh gear 42 and the twelfth gear 43 continue to rotate, the fourteenth gear 45 rotates around the sixth transmission shaft 48 driven by the twelfth gear 43, and the fourteenth gear 45 moves along the sixth transmission shaft 48 to avoid contacting the fifteenth gear 46.

Further, an end of the fourteenth gear 45 back away from the fifteenth gear 46 is further arranged with a spring; in the third motion state, the spring is in a compressed state to push the fourteenth gear 45 against the fifteenth gear 46; in the third locked state, the fourteenth gear 45 may squeeze the spring in a direction away from the fifteenth gear 46, thereby allowing the fourteenth gear 45 to rotate relative to the fifteenth gear 46.

Further, the fourteenth gear 45 and the fifteenth gear 46 may each be fixed with a third spacer 49, the two third spacers 49 are disposed between the two fourteenth gears 45 and the fifteenth gear 46, and surfaces of the two third spacers 49 facing each other have large roughness and can be respectively pressed against each other, so as to have larger friction, causing the fourteenth gear 45 to drive the fifteenth gear 46 to rotate synchronously. When the fifteenth gear 46 stops rotating, the fourteenth gear 45 may move toward the spring, thereby causing the squeezing force between the two third spacers 49 to decrease or disappear, avoiding interference between the two third spacers 49, and avoiding the fourteenth gear 45 from jamming. In the embodiments, the fourteenth gear 45 and the fifteenth gear 46 abut against each other by the third spacers 49. Of course, in other embodiments, the fourteenth gear 45 and the fifteenth gear 46 may be in direct contact with each other, and the contact surfaces thereof are set as rough surfaces.

After the second wheel train 302 is set to the above structure, when the third motor 401 continues to rotate and the gripping device 80 reaches the limit position, the third motor 401 can be prevented from jamming and rattling by the rotation of the fourteenth gear 45.

Of course, in other embodiments, the third wheel train 402 may be arranged in the form of a reduction gear only.

In some embodiments, the first driving unit 20 and the third driving unit 40 are distributed along the first horizontal direction, and the first driving unit 20 and the second driving unit 30 are distributed along the second horizontal direction.

Finally, it should be noted that the above embodiments are only intended to illustrate the technical solutions of the present disclosure, not to limit them; although the present disclosure has been described in detail with reference to the foregoing embodiments, those skilled in the art should understand that it is still possible to modify the technical solutions recorded in the foregoing embodiments, or to replace some of the technical features therein with the same; and these modifications or replacements do not cause the corresponding technical solutions to depart from the essence of the technical solutions of the present disclosure.

What is claimed is:

1. A crane machine, comprising: a first driving unit, a gripping device, a movable rope, and a fixed rope;

wherein the first driving unit comprises a first motor, a first transmission shaft, a fixed wheel, and a movable wheel; the first motor is configured to drive the first transmission shaft to rotate; the fixed wheel is fixedly connected to the first transmission shaft, and the movable wheel is movably connected to the first transmission shaft;

the fixed wheel is arranged with a first limiting portion, and the movable wheel is arranged with a second limiting portion; in a first state, the first limiting portion is spaced apart from the second limiting portion, and the fixed wheel rotates relative to the movable wheel; in a second state, the first limiting portion abuts against the second limiting portion, causing the fixed wheel to drive the movable wheel to rotate synchronously;

two ends of the movable rope are connected to the gripping device and the fixed wheel, respectively; the fixed wheel is configured to make the movable rope coiled on the fixed wheel by rotating; in condition of the movable rope being in a slack state, the gripping device is in an open state; in condition of the movable rope being in a taut state, the gripping device is in a closed state;

two ends of the fixed rope are connected to the gripping device and the movable wheel, respectively; the movable wheel is configured to make the fixed rope coiled on the movable wheel by rotating, for controlling lifting and lowering of the gripping device;

wherein the first driving unit further comprises a first gear, a second gear, a third gear, a fourth gear, and a second transmission shaft;

the first gear is movably connected to the first transmission shaft, and the second gear is fixedly connected to the first transmission shaft;

the third gear is movably connected to the second transmission shaft to be rotatable around the second transmission shaft and movable axially along the second transmission shaft; the fourth gear is fixedly connected to the second transmission shaft;

the first gear engages with an output shaft of the first motor and the third gear, respectively, and the second gear engages with the fourth gear;

in a first motion state, the third gear and the fourth gear rotate synchronously by abutting against each other; in a first locked state, the third gear rotates and the fourth gear stops rotating.

2. The crane machine according to claim 1, further comprising a main body, a first housing, and a second driving unit; wherein the main body defines a storage cavity and an outlet channel that are in communication; the first housing is arranged at a top of the storage cavity; the first driving unit is arranged on the first housing, and the second driving unit is fixed to the first housing;

the second driving unit comprises a second motor and a first mating gear; the main body comprises a first rack extending along a first horizontal direction, the first mating gear engages with the first rack, and the second motor is capable of driving the first mating gear to rotate to cause the second driving unit to move in the first horizontal direction.

3. The crane machine according to claim 2, further comprising a third driving unit fixed relative to the first driving unit; wherein the third driving unit comprises a third motor and a second mating gear, and the first housing comprises a second rack, the second rack extending in a second horizontal direction; the second mating gear engages with the second rack, and the third motor is capable of driving the second mating gear to rotate to cause the third driving unit and the first driving unit to move in the second horizontal direction; the first horizontal direction intersects with the second horizontal direction.

4. The crane machine according to claim 3, further comprising a second housing; wherein the first housing defines a mounting cavity, and the second housing and the second driving unit are disposed in the mounting cavity; the second housing defines a mounting groove, and the first driving unit and the third driving unit are fixed in the mounting groove.

5. The crane machine according to claim 4, wherein a bottom surface of the second housing is arranged with a pillar, and the first housing defines a sliding groove extending in the second horizontal direction; the pillar is movable along a length direction of the sliding groove.

6. The crane machine according to claim 1, further comprising a first resilient member; wherein in the first state, the first resilient member abuts against the movable wheel to restrict a synchronized rotation of the movable wheel with the first transmission shaft.

7. The crane machine according to claim 6, further comprising a second housing; wherein the first driving unit is disposed within the second housing;

the first resilient member comprises a resilient arm; the resilient arm comprises a first resilient segment and a second resilient segment, wherein the first resilient segment abuts against a peripheral surface of the movable wheel, and the second resilient segment abuts against the second housing; the first resilient segment is capable of approaching the second resilient segment in response to the first resilient segment being squeezed.

8. The crane machine according to claim 1, wherein the fixed wheel comprises a first wheel body and a second wheel body disposed along a rotation axis of the fixed wheel; the first wheel body defines a first groove, and the second wheel body defines a second groove, with the first groove and the second groove being disposed opposite each other; the movable rope comprises a first rope body and a plurality of first spheres sequentially disposed on the first rope body, wherein a part of one of the plurality of first spheres is disposed in the first groove, and another part of the one of the plurality of first spheres is disposed in the second groove; the first spheres are capable of movably cooperating with the first groove and the second groove; and/or the movable wheel comprises a third wheel body and a fourth wheel body disposed along a rotation axis of the movable wheel; the third wheel body defines a third groove and the fourth wheel body defines a fourth groove, with the third groove and the fourth groove being disposed opposite each other; the fixed rope comprises a second rope body and a plurality of second spheres sequentially disposed on the second rope body, wherein a part of one of the plurality of second spheres is disposed in the third groove, and another part of the one of the plurality of second spheres is disposed in the fourth groove; the second spheres are capable of movably cooperating with the third groove and the fourth groove.

9. The crane machine according to claim 1, wherein the first limiting portion is arranged on a side of the fixed wheel facing the movable wheel, the second limiting portion is arranged on a side of the movable wheel facing the fixed wheel, and the first limiting portion and the second limiting portion are each arranged as a protrusion.

10. The crane machine according to claim 1, wherein the main body comprises a base, a top cover, and a plurality of support rods; the plurality of support rods are distributed around the base; a lower end of each support rod is connected to the base, and an upper end of each support rod is connected to the top cover; the base, the top cover, and the plurality of support rods jointly enclose each other to define the storage cavity;

an alignment channel is defined within one of the plurality of support rods, and the alignment channel is configured for a power supply connecting wire to be threaded.

* * * * *